(12) United States Patent
Han

(10) Patent No.: US 11,453,117 B2
(45) Date of Patent: Sep. 27, 2022

(54) PARALLEL-SERIES CONNECTION WALKING ROBOT AND CONSTRUCTION METHOD THEREOF

(71) Applicant: Fangyuan Han, Changchun (CN)

(72) Inventor: Fangyuan Han, Changchun (CN)

( * ) Notice: Subject to any disclaimer, the term of this patent is extended or adjusted under 35 U.S.C. 154(b) by 430 days.

(21) Appl. No.: 16/633,955

(22) PCT Filed: Jul. 31, 2018

(86) PCT No.: PCT/CN2018/097761
§ 371 (c)(1),
(2) Date: Jan. 24, 2020

(87) PCT Pub. No.: WO2019/024839
PCT Pub. Date: Feb. 7, 2019

(65) Prior Publication Data
US 2020/0206905 A1    Jul. 2, 2020

(30) Foreign Application Priority Data

Aug. 1, 2017 (CN) .......................... 201710644487.0

(51) Int. Cl.
*B25J 9/00* (2006.01)
*B25J 5/00* (2006.01)
(Continued)

(52) U.S. Cl.
CPC ............. *B25J 9/0072* (2013.01); *B25J 5/007* (2013.01); *B25J 19/0004* (2013.01); *B62D 57/032* (2013.01)

(58) Field of Classification Search
CPC ...... B25J 13/084; B25J 19/023; B25J 9/1697; G01L 1/04; G01L 1/241; G01L 5/166;
(Continued)

(56) References Cited

U.S. PATENT DOCUMENTS

2018/0333921 A1*  11/2018  Hender ................ A43B 13/189

FOREIGN PATENT DOCUMENTS

CN          101973027       2/2011
CN          104972453       10/2015
(Continued)

*Primary Examiner* — Ian Jen
(74) *Attorney, Agent, or Firm* — Reinhart Boerner Van Deuren P.C.

(57) ABSTRACT

A parallel-series connection walking robot and a construction method thereof. The parallel-series connection walking robot mainly comprises leg mechanisms A and B; one leg mechanism A is a parallel-series connection leg mechanism (3); the other leg mechanism B is a parallel-series connection leg mechanism (3) or a foot parallel-connection mechanism (1); and the parallel-series connection leg mechanism (3) is formed of a thigh mechanism (3.2) and a foot parallel-connection mechanism (3.1) through serial connection. The two leg mechanisms have a combination of a specific DOF; upper portions of the two leg mechanisms are fixedly connected together; all members are comprised by and intersected with each other, but have independent activity spaces, respectively; and projections of the triangles formed by toes of the two leg mechanisms on a horizontal plane overlap with each other. During an advancing process, the robot can stably walk in any direction without left-right gravity center adjustment; and the robot also has the advantages of less kinematic pairs, lower robot body height, strong bearing capacity, steering flexibility, strong obstacle crossing ability and climbing up and down ability.

17 Claims, 13 Drawing Sheets

(51) Int. Cl.
*B25J 19/00* (2006.01)
*B62D 57/032* (2006.01)
(58) Field of Classification Search
CPC . G01L 5/226; G01L 5/228; G01L 1/24; G06T 7/74; G06T 2207/30204; G05B 2219/40575; G05B 2219/40625
See application file for complete search history.

(56) References Cited

FOREIGN PATENT DOCUMENTS

| | | |
|---|---|---|
| CN | 107414793 | 12/2017 |
| WO | WO 2004041486 | 5/2004 |
| WO | WO 2015168799 | 11/2015 |

* cited by examiner

PARALLEL-SERIES CONNECTION WALKING ROBOT AND CONSTRUCTION METHOD THEREOF

TECHNICAL FIELD

The invention discloses a construction method of a hybrid-connection (parallel-series connection) walking robot and a hybrid-connection walking robot thus constructed. The invention provides an improvement to existing two-legged walking robot structures and belongs to the technical field of walking robots.

BACKGROUND ART

Existing two-legged walking robots mainly include bionic walking robots and non-bionic walking robots. The non-bionic walking robots mainly have a configuration disclosed in Chinese Patent 201010292424.1 (hereinafter referred to as Document 1). In the configuration of this type of walking robots, some robots have a structure in which generalized translational pairs are connected in series below parallel mechanisms (the configuration given in claim 10 of Document 1). The common feature of them is that, in each of the two-legged mechanisms, each leg mechanism is composed of a parallel mechanism and three generalized translational pairs (called shanks). Since the parallel mechanism itself includes an Rx DOF (degree of freedom) and an Ry DOF, and the three generalized translational pairs can also form Rx DOF and Ry DOF, the Rx DOF and Ry DOF on the thigh mechanism are redundant DOFs. At the same time, the parallel mechanism itself contains a Tz DOF, and the three generalized translational pairs also have a Z-direction DOF, so Z-direction DOFs on the leg mechanism are also redundant DOFs. Due to the existence of these redundant DOFs, the walking robot given in Document 1 has the following defects. 1) It has a relatively large number of kinematic pairs, a large body height, and poor passability. 2) When the body is tilted in the Rx and Ry directions, the shank will not be perpendicular to the ground, the stress in the shanks will become worse, and the climbing ability will be limited. The problem resulted from these defects is that, for achieving the same walking function, more kinetic pairs are needed and the performance cannot be fully carried out.

At the same time, because each shank of the walking robot given in the above document has only one DOF (P pair) in Z-direction, the spacing between toes cannot be changed (adjusted), and their three landing points cannot be adjusted independently, so the choice of landing points is limited. Therefore, the adaptability to the road surface is poor. The ability to overcome obstacles cannot be fully carried out.

The above mentioned non-bionic walking robot also has a common disadvantage. It only relies on walking to move, and the moving speed on the structured road is low and the efficiency is not high.

Such non-bionic walking robots also include a double-sided symmetrical walking robot solution disclosed in Chinese Patent 201510275161.6 (hereinafter referred to as Document 2, see claims 13-17 of Document 2). Since the leg mechanism of Document 2 is the solution disclosed in Document 1, the above problems also exist in the double-sided symmetrical walking robot configuration disclosed in Document 2.

Therefore, the following common disadvantages have been found in this type of walking robots.

1) Because the Rx DOF and Ry DOF on the parallel mechanism are redundant DOFs, there are a relatively large number of kinetic pairs in the parallel mechanism and the structure is more complicated.

2) Since the parallel mechanism is a spatial parallel mechanism, and Z-direction DOF are also redundant DOFs, the sixe or the robot is large, the height of the body is large, and the passability is poor.

3) Because the branch chain of the foot parallel mechanism has only one DOF, the toe spacing cannot be changed, the choice of landing points is limited, the adaptability to the road surface is poor, and the ability to overcome obstacles is poor. In some cases, it also affects the passability.

4) The movement mode is single, the movement speed on the structure road is low, and the efficiency is low.

5) The double-sided motion walking robot solution also requires a relatively large number of kinetic pairs, so the body height is relatively large, the structure is relatively complicated, and the passability is poor.

SUMMARY OF THE INVENTION

In view of the problems found in the prior art, the present invention provides a robot having the characteristics listed below, by means of which, the above problems in the prior art can be solved. In addition, the present invention can achieve the following objectives.

1) The invention provides a new method for constructing a hybrid-connection walking robot, which solves the problems resulted from Rx, Ry redundant DOFs and Z-direction redundant DOF, thereby achieving the same walking motion with fewer DOFs, while achieving better performance.

2) The present invention also provides a hybrid-connection walking robot that implements the above method. This walking robot can achieve the same walking motion with fewer translational pairs, while achieving better performance.

The technical solutions implemented by the present invention to solve technical problems are listed below.

A hybrid-connection walking robot construction method is disclosed, the construction method comprising:

(1) constructing foot parallel mechanisms and thigh mechanisms, including:

constructing the foot parallel mechanisms:

wherein each foot parallel mechanism comprises one foot base platform, three phalange branch chains and three toes, the three phalange branch chains are fixedly connected to the foot base platform at connection points which are located on the three vertices of a triangle; lower ends of the three phalange branch chains are connected to the toes respectively, and the three toes form a toe triangle; the foot parallel mechanism forms a lifting-standing leg; and each phalange branch chain is a mechanism formed by the combination of the following types of DOFs (degrees of freedom): Tz, TzTx, TzTy, TzTxTy, RxTz, RyTz, RxTzTx, RyTzTy or RxRyTz;

constructing the thigh mechanisms:

wherein each thigh mechanism comprises an upper platform, a lower platform and one or more thigh branch chains connecting the upper platform with the lower platform; each thigh branch chain comprises one kinematic pair, one or more series mechanisms, or a hybrid-connection mechanism; the thigh mechanism is a mechanism with one to five DOFs; and the one to five DOFs comprise any one of or any combination of Tx, Ty, Tz, Rz and Rx DOFs or Tx, Ty, Tz, Rz, Rx and Ry DOFs, and include a single DOF, 2 DOFs, 3 DOFs, 4 DOFs or 5 DOFs;

(2) constructing hybrid-connection leg mechanisms:
wherein each hybrid-connection leg mechanism comprises one thigh mechanism and one foot parallel mechanism, the foot parallel mechanism being located below the thigh mechanism, and the two being connected in series to form a hybrid-connection leg mechanism; and the foot base platform of the foot parallel mechanism or the lower platform of the thigh mechanism is selected as a common base platform;

(3) selecting two suitable leg mechanisms—leg mechanisms A and B:
in the above mentioned hybrid-connection leg mechanisms, one hybrid-connection leg mechanism is selected as leg mechanism A;
in the above mentioned hybrid-connection leg mechanisms and foot parallel mechanisms, one hybrid-connection leg mechanism or foot parallel mechanism is selected as leg mechanism B;
wherein the combination of the DOFs of the two leg mechanisms should meet the following requirement:
the two leg mechanisms must at least have one Rz DOF and one Tx or Ty DOF, or the hybrid-connection leg mechanism of at least one thigh mechanism has both Rz DOF and Tx or Ty DOF; or two thigh mechanisms each have Rz DOF and Tx or Ty DOF;

(4) connecting the two leg mechanisms (A and B) to build a hybrid-connection walking robot:
wherein if the two leg mechanisms (A and B) are two hybrid-connection leg mechanisms, the upper platforms of the thigh mechanisms of the two leg mechanisms (A and B) are fixedly connected together so that the two connected upper platforms form a pelvis and the two connected leg mechanisms form a hybrid-connection walking robot;
if one of the two leg mechanisms is a hybrid-connection leg mechanism and the other one is a foot parallel mechanism, the upper platform of the thigh mechanism of the hybrid-connection leg mechanism is fixedly connected with the foot base platform of the foot parallel mechanism so that the two connected platforms form a pelvis and the two connected leg mechanisms form a hybrid-connection walking robot; and
for the above connecting, the thigh branch chains, the base platforms, metatarsal branch chains, the toes and toe triangles should meet the following layout requirements:
each thigh branch chain of the two leg mechanisms has its own independent movement space, without any interference with each other;
the two base platforms must be disposed in a manner of: one be higher and the other be lower, or one be inside and the other be outside, or one be forward and the other be backward, without any interference with each other;
the metatarsal branch chains of the two leg mechanisms each have their own independent working space, without any interference with each other;
the projections of the toes of the two leg mechanisms on the horizontal plane do not overlap each other;
the distance between the centers of gravity of the toe triangles of the connected two leg mechanisms is less than the sum of the radii of the circumcircles of the two toe triangles, and the projections of the two toe triangles on the horizontal plane have an overlapping portion.

A hybrid-connection walking robot constructed using the above hybrid-connection walking robot construction is also disclosed, the walking robot comprising two leg mechanisms—leg mechanisms A and B, one leg mechanism A being a hybrid-connection leg mechanism, and the other leg mechanism B being a hybrid-connection leg mechanism or a foot parallel mechanism; wherein upper portions of the two leg mechanisms are connected together, and the hybrid-connection leg mechanism comprises a foot parallel mechanism and a thigh mechanism;

the foot parallel mechanism:
it comprises one foot base platform, three phalange branch chains and three toes, the three phalange branch chains are fixedly connected to the foot base platform at connection points which are located on the three vertices of a triangle; lower ends of the three phalange branch chains are connected to the toes respectively, and the three toes form a toe triangle; the foot parallel mechanism forms a lifting-standing leg; and the phalange branch chain is a branch chain having one or more DOFs; the DOFs of the phalange branch chains are a combination of one or more selected DOFs from a group of Tz, TzTx, TzTy, TzTxTy, RxTz, RyTz, RxTzTx, RyTzTy and RxRyTz; and the three phalange branch chains may be of the same type or different types;

the thigh mechanism:
it comprises an upper platform, a lower platform and one or more thigh branch chains connecting the upper platform with the lower platform; the lower platform of the thigh mechanism is a foot arch type base platform; each thigh branch chain may comprises one kinematic pair, one or more series mechanisms, or a hybrid-connection mechanism; the thigh mechanism is a mechanism with one to five DOFs; and the one to five DOFs comprise any one of or any combination of Tx, Ty, Tz, Rz and Rx DOFs or Tx, Ty, Tz, Rz, Rx and Ry DOFs;

the hybrid-connection leg mechanism:
it comprises one thigh mechanism and one foot parallel mechanism, the foot parallel mechanism being located below the thigh mechanism, and the two being connected in series to form a hybrid-connection leg mechanism; the foot parallel mechanism and the thigh mechanism share one platform, and the two are connected together by one base platform;

the two leg mechanisms (A, B):
one leg mechanism A is a hybrid-connection leg mechanism, and the other leg mechanism B is a hybrid-connection leg mechanism or a foot parallel mechanism;
wherein the combination of the DOFs of the two leg mechanisms should meet the following requirement:
the thigh mechanisms of the two leg mechanisms must at least have one Rz DOF and one Tx or Ty DOF, or the hybrid-connection leg mechanism of at least one thigh mechanism has both Rz DOF and Tx or Ty DOF; or two thigh mechanisms each have Rz DOF and Tx or Ty DOF;
wherein if the two leg mechanisms (A and B) are two hybrid-connection leg mechanisms, the upper platforms of the thigh mechanisms of the two leg mechanisms (A and B) are fixedly connected together so that the two connected upper platforms form a pelvis and the two connected leg mechanisms form a hybrid-connection walking robot;
if one of the two leg mechanisms is a hybrid-connection leg mechanism and the other one is a foot parallel mechanism, the upper platform of the thigh mechanism of the hybrid-connection leg mechanism is fixedly connected with the foot base platform of the foot parallel mechanism so that the two connected platforms form a pelvis and the two connected leg mechanisms form a hybrid-connection walking robot;
each thigh branch chain of the two leg mechanisms has its own independent movement space, without any interference with each other;
the two base platforms are disposed in a manner of: one be high and the other be low, or one be inside and the other be outside, or one be front and the other be back, without any interference with each other;

the metatarsal branch chains of the two leg mechanisms each have their own independent working space, without any interference with each other;

the projections of the toes of the two leg mechanisms on the horizontal plane do not overlap each other;

the distance between the centers of gravity of the toe triangles of the connected two leg mechanisms is less than the sum of the radii of the circumcircles of the two toe triangles, and the projections of the two toe triangles on the horizontal plane have an overlapping portion.

Beneficial effects of the present invention are described below.

1) The present invention proposes a new hybrid-connection mechanism as a leg mechanism, which basically retains the main advantages of the parallel mechanisms, the structure has large rigidity, compact and stable structure, good dynamic performance, strong load capacity, small error accumulation, and high control accuracy; it has steering flexibility, strong uphill ability and better energy consumption characteristics. In addition, it is easy to conduct controlling and track planning.

2) For performing the same walking motion, the robot of the present invention has six DOFs fewer than that of the robots disclosed in the cited documents. For example, for a walking robot capable of climbing a large slope, the present invention requires 12 DOFs, Document 1 requires 18 DOFs, and a traditional bionic robot requires even more DOFs. The invention realizes the same walking exercise with fewer kinetic pairs and lower body height, better passability, stronger climbing ability, and better stress state.

3) For a hybrid-connection walking robot having metatarsal branch chains with more than two translational DOFs, the toe spacing can be changed, and each landing point can be independently selected, which improves the adaptability to the road surface and the passability.

4) Because wheels (wheel-type rotational pairs) are designed at the end of the metatarsal branch chains, there are two types of movement methods for the hybrid-connection walking robot. When the wheels are used to move on the structure road, the speed and efficiency of the movement will be greatly improved.

5) The invention also provides a walking robot having both a double-sided walking function, a wheeling (running on wheels) function, and a rolling movement function. The double-sided motion hybrid-connection walking robot solution has fewer kinetic pairs and the structure is simpler. Further, the height of the body is small, and the passability is good. When moving on one side, there are no extra moving parts.

6) It runs relatively smoothly and can obtain more accurate images. The present invention can keep the body basically horizontal in various states (including on slopes) during the movement process, thereby avoiding the severe jitter of the captured video image and obtaining a more accurate image. It also provides a good basis for autonomous control.

Figure 1:
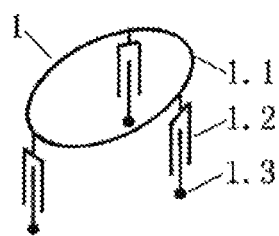
FIGS. 1-4 are perspective views of four different foot parallel mechanisms.

In the figures, terms and reference numerals of the foot parallel mechanism include: foot parallel mechanism 1, upper platform of foot parallel mechanism (foot base platform) 1.1, metatarsal branch chain 1.2, toe 1.3, wheeled rotational pair (wheel) 1.4, transmission box 1.5, input end 1.6, output end 1.7; terms and reference numerals of the thigh mechanism include: thigh mechanism 2, thigh upper platform 2.1, thigh branch chain 2.2, thigh lower platform (thigh base platform) 2.3; terms and reference numerals of the hybrid-connection leg mechanism include: hybrid-connection leg mechanism 3, foot parallel mechanism 3.1, thigh mechanism 3.2, base platform 3.3; terms and reference numerals of the hybrid-connection walking robot include: hybrid-connection walking robot 4, leg A 4.1, leg B 4.2, pelvis 4.3, big ring 5.1.

In FIGS. 34-43, terms and reference numerals include: leg A base platform 1.1a, leg B base platform 1.1b; leg A metatarsal branch chain 1.2a, leg B metatarsal branch chain 1.2b; leg A hip joint (hip bone) 3.1a, leg B hip joint 3.1b; double-acting metatarsal branch chain transmission box 1.8, outer ring 4.4, hole closing device 4.5.

DETAILED DESCRIPTION OF PREFERRED EMBODIMENTS

The present invention will be further described in detail with reference to the drawings and exemplary embodiments.

A method for constructing a hybrid-connection walking robot, in particular a method for constructing a walking robot that comprises two leg mechanisms (A and B), is disclosed, the method comprising the steps described below.

(1) Constructing a foot parallel mechanism (lifting-standing leg mechanism) and a thigh mechanism:

Constructing a foot parallel mechanism (lifting-standing leg mechanism):

Each foot parallel mechanism comprises one foot base platform, three phalange branch chains and three toes, the three phalange branch chains are fixedly connected to the foot base platform at connection points which are located on the three vertices of a triangle. Lower ends of the three phalange branch chains are connected to the toes respectively, and the three toes form a toe triangle. Each phalange branch chain is a mechanism formed by the combination of the following types of DOFs (degrees of freedom): Tz, TzTx, TzTy, TzTxTy, TzRx, TzRy, TzTxRx, TzTyRy, TzRxRy.

The three metatarsal branch chains each occupy an independent space of activity and without any interference with each other; the three metatarsal branch chains can be the same or different branch chains.

Y-shaped, O-shaped, C (U, V)-shaped, T-shaped, triangular, and butterfly-shaped foot base platforms are shapes that all can be selected when the foot base platform is configured. These structures are only approximate expressions. However, it is not limited to these structural shapes.

The coordinate system and the meaning of the symbols are described below.

A Cartesian coordinate system is established as follows: the XY plane of the coordinate system is the horizontal plane, Z-axis is perpendicular to the horizontal plane, the X direction is the forward direction of the walking robot, and the Y direction is the lateral movement direction.

The symbols have the meanings listed below (throughout the present application).

T: a translational DOF;

Tx, Ty, and Tz represent DOFs in the X-axis direction, Y-axis direction and Z-axis direction respectively.

R: a rotational DOF, or a rotational pair,

Rx, Ry, and Rz represent rotational DOFs around X-axis, around Y-axis and around Z-axis respectively.

The foot parallel mechanism is a semi-closed-loop parallel mechanism, which mainly has the basic functions of lifting and standing. Therefore, the foot parallel mechanism is also called a lifting-standing leg. The foot parallel mechanism can be used alone as a lifting-standing leg.

A semi-closed-loop parallel mechanism is a special parallel mechanism that is a closed-loop mechanism when the leg is in the phase and an open-loop mechanism when the leg is in the phase.

For a detailed description of the metatarsal branch chain and toes, please see "About foot parallel mechanism", "About metatarsal branch chain" and "About toes" sections below.

About constructing the thigh mechanism:

The thigh mechanism comprises an upper platform, a lower platform, and one or more thigh branch chains (including a branch chain composed of a kinetic pair) that are connected to the upper platform and the lower platform. The lower platform of the thigh mechanism is also called a thigh base platform. The upper platform of the thigh mechanism is also called a hip bone. The thigh branch chain can be a kinematic pair, one or more series mechanisms, or a hybrid-connection mechanism. The thigh mechanism is a mechanism with one to five DOFs. The one to five DOFs are any one or any combination of Tx, Ty, Tz, Rz, Rx or Ry DOF, including single DOF, two, three, four and five DOFs. There are several types of thigh mechanism: spatial mechanism, planar mechanism, hybrid-connection linkage mechanism, or single kinetic pair.

Y-shaped, O-shaped, C (U, V)-shaped, T-shaped, triangular, butterfly-shaped thigh base platforms, etc., are shapes that all can be selected when the thigh base platform is configured. However, it is not limited to these structural shapes.

The main function of the thigh mechanism is to provide horizontal movement and rotation around Z-axis. There may or may not be a DOF in Z-direction movement. Preferably, neither leg mechanism contains Rx DOF or Ry DOF.

For the thigh mechanism with multiple branch chains, the same branch chain or different branch chains can be applied. For thigh mechanisms without Rx or Ry DOF, there may be at least one DOF and up to four DOFs. For thigh mechanisms with Rx or Ry DOF, there may be up to five DOFs.

The foot parallel mechanism (the lifting-standing leg mechanism) and the thigh mechanism are constructed in no particular sequence.

For a detailed description of the thigh mechanism, please see the "About thigh mechanism" section below.

(2) Constructing the hybrid-connection leg mechanism:

The hybrid-connection leg mechanism comprises a thigh mechanism and a foot parallel mechanism. The foot parallel mechanism is below the thigh mechanism, and the two are connected in series to form a hybrid-connection leg mechanism. The foot base platform of the foot parallel mechanism shares a platform with the thigh base platform of the thigh mechanism. The common platform is called a base platform.

(3) Selecting two suitable leg mechanisms (A, B):

In the above mentioned hybrid-connection leg mechanism, one hybrid-connection leg mechanism is selected as leg mechanism A.

In the above mentioned hybrid-connection leg mechanism and foot parallel mechanism, one hybrid-connection leg mechanism or foot parallel mechanism is selected as leg mechanism B.

Requirements on the two leg mechanisms are:

The two leg mechanisms must have at least one Rz DOF, one Tx (or Ty) DOF, or the thigh mechanism of at least one hybrid-connection leg mechanism must both Rz DOF and Tx (or Ty) DOF. The best solution is that both thigh mechanisms have Rz DOF and Tx and Ty DOFs. Tz DOF is only optional.

Since the foot parallel mechanism of each leg mechanism has Rx, Ry, Tz DOFs, the two leg mechanisms cooperate with each other to complete normal stepping and steering.

There are two types of combinations: hybrid-connection leg mechanism+hybrid-connection leg mechanism; hybrid-connection leg mechanism+foot parallel mechanism.

(4) Connecting the two leg mechanisms (A and B) to build a hybrid-connection walking robot:

About connection of leg mechanisms A and B:

If the two leg mechanisms (A, B) are two hybrid-connection leg mechanisms, the upper platforms of the thigh mechanisms of the two leg mechanisms (A, B) are fixedly connected together, and the two connected upper platforms form a pelvis, and the two leg mechanisms connected together form a hybrid-connection walking robot;

If one of leg mechanism A and B is a hybrid-connection leg mechanism and the other leg mechanism is a foot parallel mechanism, the upper platform of the thigh mechanism of the hybrid-connection leg mechanism and the foot base platform of the foot parallel mechanism are fixed together.

The two connected platforms form a pelvis, and the two leg mechanisms connected together form a hybrid-connection walking robot.

When connecting, requirements on the arrangement of the thigh branch chains, the base platforms, the metatarsal branch chains, the toes and the toe triangles are listed below.

Each thigh branch chain of the two leg mechanisms has its own independent movement space and does not interfere with each other.

The two base platforms are disposed to be: one high and one low, or one inside and one outside, or one forward and the other backward, and without any interference with each other.

The metatarsal branch chains of the two leg mechanisms have their own independent movement spaces and without any interference with each other.

The projections of the toes of the two leg mechanisms on the horizontal plane do not overlap each other.

The distance between the centers of gravity of the toe triangles of the two leg mechanisms which are connected together is less than the sum of the radii of the circumcircles of the two toe triangles, and the projections of the two toe triangles on the horizontal plane overlap each other.

The main purpose of the choice and configuration of the base platform is to ensure that each of the two base platforms has an independent movement space, thereby ensuring that the metatarsal branch chains installed on it also have independent movement spaces.

The purpose of connecting the two leg mechanisms is to include two leg structures with complex structures, which are interspersed with each other, to ensure that each moving part has its own movement space, so as to rationally arrange the movement of the two leg mechanisms to achieve various walking movements.

The center of gravity of the robot is generally located at the midpoint of the center line of the upper platform of the two legs. This center of gravity is generally arranged directly above the midpoint of a line connecting the two centers of gravity of the toe triangles.

For a detailed description of the connection between the two leg mechanisms, please see "About connection of two leg mechanisms and about pelvis" section below.

The hybrid-connection walking robot implementing the above construction method includes two leg mechanisms, A and B, one leg mechanism A is a hybrid-connection leg mechanism, and the other leg mechanism B is a hybrid-connection leg mechanism or a foot parallel mechanism; upper parts of the two leg mechanisms A and B are connected together.

The hybrid-connection leg mechanism comprises a foot parallel mechanism and a thigh mechanism.

About foot parallel mechanism (lifting-standing leg mechanism):

The foot parallel mechanism comprises one foot base platform, three metatarsal branch chains and three toes. The three metatarsal branch chains are fixedly connected to the foot base platform, and the connection points are located on three vertices of a triangle. Lower ends of the three metatarsal branch chains are connected to the toes, and the three toes form a toe triangle. The foot parallel mechanism is a semi-closed-loop parallel mechanism, and the semi-closed-loop parallel mechanism is a special parallel mechanism. The foot parallel mechanism is a lifting-standing leg. Therefore, the foot parallel mechanism is also called a lifting-standing leg.

The metatarsal branch chain is a branch chain with one or more DOFs. The DOF combination of the phalange branch chain is one or more DOF combinations of Tz, TzTx, TzTy, TzTxTy, RxTz, RyTz, RxTzTx, RyTzTy, RxRyTz.

Corresponding to the above DOF combinations, relatively typical metatarsal branch chains include: P, PP, PP, RP, RP, PPP, RPP, RPP, UP.

Base platforms such as Y-shape, O-shape, C (U, V), T-shape, triangle, butterfly, etc., are shapes that all can be selected when the base platform is configured. However, it is not limited to these structural shapes. The shapes and configurations of the base platforms (foot arches) disclosed in Document 1 can be used in the present invention.

Each of the three metatarsal branch chains occupies an independent working space without interference with each other. The three branch chains can be the same branch chain or different branch chains.

A leg mechanism with only Rx and Ry DOFs is only a standing leg and has no other functions.

In order to provide a leg mechanism with a function of lifting and standing, each of the metatarsal branch chains has a translational DOF in Z-direction. A single-DOF metatarsal branch chain made of a rotational pair can change the toe spacing. The reason is that the rotational pair of an axis on the plane of the base platform has a vertical translational component and a horizontal translational component. The horizontal translational component can be used to change the toe spacing.

In order to provide a better leg mechanism that can independently change the toe spacing, in the hybrid-connection walking robot, the metatarsal branch chain of the foot parallel mechanism has at least one metatarsal branch chain, and in addition to a translational DOF in Z-axis direction, there are also one or two translational DOFs in the horizontal direction. That is, it has a Tz DOF as well as horizontal translational DOFs in one or two directions.

In practice, the main function of the foot parallel mechanism is a lifting-standing leg. Therefore, the foot parallel mechanism can be used alone as a lifting-standing standing leg. The metatarsal branch chain with horizontal DOF can adjust the toe spacing, and also provide horizontal translational DOFs.

A foot parallel mechanism that cannot change the toe pitch (such as the walking robot given in Document 1) can only walk on two parallel wooden boards with a certain width. After changing the toe spacing, the robot can walk on parallel wooden boards of various widths. The robot can even take a short walk on the wooden bridge. Thus, the present invention improves the adaptability to the road.

For a detailed explanation of the foot parallel mechanism, please see the following three sections "About foot parallel mechanism", "About metatarsal branch chain" and "About toes".

About thigh mechanism:

The thigh mechanism comprises an upper platform, a lower platform, and one or more thigh branch chains (including a branch chain composed of a kinetic pair) connected to the upper platform and the lower platform. The lower platform of the thigh mechanism is called a thigh base platform. The thigh branch chain can be a kinematic pair, one or more series mechanisms, or a hybrid-connection mechanism.

The thigh mechanism is a mechanism with one to five DOFs. The one to five DOFs of the thigh mechanism comprise any combination of Tx, Ty, Tz, Rz, Rx or Tx, Ty, Tz, Rz, Ry DOFs, including a single DOF, 2, 3, 4 or 5 DOFs. There may be a total number of 36 types. In them, there are 14 types of mechanisms without Rx or Ry DOF; and among them, 4 types of structures are planar mechanisms.

Y-shaped, O-shaped, C (U, V)-shaped, T-shaped, triangular, butterfly-shaped thigh base platforms, etc., are shapes that all can be selected when the thigh base platform is configured. However, it is not limited to these structural shapes.

The above mechanism containing Rx or Ry DOF is not the best thigh mechanism. It is a better solution that neither leg mechanism contains Rx DOF or Ry DOF.

When the thigh mechanism is a spatial parallel mechanism or a hybrid-connection mechanism, the DOF combination of the spatial mechanism and the hybrid-connection mechanism is 3TRz, 3TOR, (3TOR)Rz, (3TRz)Rz or (TxTy)Rz; the best DOF combination in the spatial mechanism is 3TRz, and the best configuration in the hybrid-connection mechanism is (3TOR)Rz, and (TxTy)Rz, (RzTxTy)Rz. Rz in the hybrid-connection mechanism can be used for continuous steering.

Therefore, when the thigh mechanism is a spatial parallel mechanism or a hybrid-connection mechanism, the better solution is that the combination of DOF is one of: 3TRz and (3TOR)Rz, (TxTy)Rz, (TxTyRz)Rz.

When the thigh mechanism of the two leg mechanisms is a flat mechanism, the structure is the simplest without any redundant DOFs. Therefore, the planar mechanism is the best solution in the thigh mechanism. The DOF combination is one of: TxTyRz, TxTy, TxRz, and TyRz. The three-DOF planar mechanism is the best solution among them.

The main function of the thigh mechanism is to provide horizontal movement and rotation around Z-axis. Horizontal movement and rotation around Z-axis can be distributed on both legs. They can be integrated in one leg; or distributed in both legs. The thigh mechanism allows redundant DOFs with Tz, Rx, Ry. However, Rx and Ry DOFs cannot appear on one leg mechanism at the same time.

The upper platform of the thigh mechanism is also called a hip bone.

For a detailed description of the thigh mechanism, please see the "About thigh mechanism" section below.

About hybrid-connection leg mechanism:

The hybrid-connection leg mechanism comprises a thigh mechanism and a foot parallel mechanism. The foot parallel mechanism is below the thigh mechanism, and the two are connected in series to form a hybrid-connection leg mechanism. The foot parallel mechanism and the thigh mechanism share an base platform, and the two are connected together through this common platform. The common platform is called a base platform.

The main purpose of constructing a hybrid-connection leg mechanism is to enable the foot parallel mechanism to obtain functions such as stepping and steering. The hybrid-connection leg mechanism allows redundant DOFs.

The requirements for the two leg mechanisms are listed below.

Structural requirements: one leg mechanism is a hybrid-connection leg mechanism, and the other leg mechanism is a hybrid-connection leg mechanism or a foot parallel mechanism.

DOF combination requirements: The thigh mechanism of two leg mechanisms must have at least one Rz DOF, one Tx (or Ty) DOF, or the thigh mechanism of at least one hybrid-connection leg mechanism has both Rz DOF and Tx (or Ty) DOF. The best solution is that both thigh mechanisms have Rz DOF and Tx and Ty DOFs. The Tz DOF of the thigh mechanism is only optional. Since the foot parallel mechanism of each leg mechanism has Rx, Ry, Tz DOFs, the two leg mechanisms can complete normal stepping and steering.

There are two combinations. Combination 1: leg mechanism A is a hybrid-connection leg mechanism+leg B mechanism is a hybrid-connection leg mechanism; Combination 2: leg mechanism A is a hybrid-connection leg mechanism+leg B mechanism is a foot parallel mechanism.

Two full DOF hybrid-connection leg mechanisms can be combined into a hybrid-connection walking robot. A full DOF hybrid-connection leg mechanism and a low DOF leg mechanism or foot parallel mechanism can also be combined to form a hybrid-connection walking robot. Two leg mechanisms with low DOFs can form a hybrid-connection walking robot only when they meet a certain requirement on DOFs.

About connection of leg mechanisms A and B:

If both leg mechanisms are hybrid-connection leg mechanisms, the upper platform of the thigh mechanisms of the two leg mechanisms A and B are fixedly connected together, the two connected upper platforms form a pelvis, and the two connected leg mechanisms form a hybrid-connection walking robot.

If one leg mechanism is a hybrid-connection leg mechanism and the other leg mechanism is a foot parallel mechanism, the upper platform of the thigh mechanism of the hybrid-connection leg mechanism is fixedly connected with the foot base platform of the foot parallel mechanism. The platforms form a pelvis, and the two connected leg mechanisms form a hybrid-connection walking robot.

When connecting, requirements on the arrangement of the thigh branch chains, the base platforms, the metatarsal branch chains, the toes and the toe triangles are:

each thigh branch chain of the two leg mechanisms has its own independent movement space without interference;

the two base platforms are either one high and one low, or one inside and one outside, or one forward and one backward, and without any interference with each other;

the metatarsal branch chains of the two leg mechanisms have their own independent movement spaces without interference; and the projections of the toes of the two leg mechanisms on the horizontal plane do not overlap each other.

The distance between the centers of gravity of the toe triangles of the two leg mechanisms connected together is less than the sum of the radii of the circumcircles of the two toe triangles, and the projections of the two toe triangles on the horizontal plane overlap each other.

Base platforms such as Y-shaped, O-shaped, C (U, V)-shaped, T-shaped, triangular, butterfly, etc., are shapes that all can be selected when the base platform is configured. These several structures are only approximate expressions. However, it is not limited to these structures. The configuration of the two base platforms is based on the highest principle of no interference with each other.

In practice, the general requirements for thigh branch chains, the base platforms, the toes and the toe triangles are that each component has its own independent range of motion and does not interfere with each other. In some special spaces, the working spaces are allowed to partially overlap (for example, at the junction of two movement spaces), and the purpose of no interference can also be achieved through control, just like the two legs of a person. By means of such a configuration, better performance can be obtained through control.

The center of gravity of the robot is generally located at the midpoint of the center line of the upper platform of the two legs. This midpoint is usually placed directly above the midpoint of the line connecting the two toe triangles.

The purpose of the connection is to include two leg structures with complex structures, which are interspersed with each other, to ensure that each moving part has its own movement space, thereby realizing various walking movements by reasonably arranging the movement of the two leg mechanisms. After being connected together, the thigh branch chains of the two leg mechanisms must have their own movement spaces; after being connected together, the two metatarsal branch chains also have their own movement spaces.

For the distance between the centers of gravity of the two toe triangles, there are two preferable structural solutions as described below.

When the upper platforms of the two leg mechanisms A and B are fixedly connected together, the distance between the centers of gravity of the toe triangles of the two leg mechanisms is one of the following two cases:

a) the distance between the centers of the toe triangles of the two leg mechanisms is 0 or less than 0.20 (Ra+Rb), see Embodiment 1;

b) the distance between the centers of the toe triangles of the two leg mechanisms is greater than or equal to 0.30 (Ra+Rb) but less than or equal to 0.70 (Ra+Rb). See Embodiment 3;

where Ra is the radius of the circumcircle of the toe triangle of leg mechanism A, Rb is the radius of the circumcircle of the toe triangle of leg mechanism B.

The first case is an isotropic connection configuration, which is called an inner-outer structure configuration (see Embodiments 1 and 2); the second case is a non-isotropic configuration, which is called a cross-structure configuration (see Embodiments 3 and 4).

For the inner-outer structure configuration, if there are two identical leg mechanisms, there is a phase difference of about 60 degrees when the two upper platforms are connected.

In the cross-structure configuration, generally, the toes of one leg mechanism generally fall on the center of the triangle of the other toe triangle.

In order to provide a hybrid-connection walking robot that can still walk when the robot body is turned, the robot comprising leg mechanisms A and B and the pelvis, the metatarsal branch chains of the two leg mechanisms of the hybrid-connection walking robot may be one of the following metatarsal branch chains or a combination of two of the following metatarsal branch chains:

A) the first kinetic pair of the metatarsal branch chain is a double-acting kinetic pair, and the axis of the kinetic pair is perpendicular to the plane of the base platform;

B) the first kinetic pair of the metatarsal branch chain is a rotational pair, and the metatarsal branch chain is PHRHP, where the axis of the rotational pair is perpendicular to the plane of the base platform;

C) the first kinetic pair of the metatarsal branch chain is a rotational pair. The axis of the rotational pair is parallel to the plane of the base platform.

In this way, a robot that can walk on both sides is formed. The double-acting kinetic pair or PHRHP branch chain each have two output ends, one on the top and one on the bottom. Both sides can work. The rotational pair transfers the output end of the metatarsal branch chain to the other side by turning, and both sides can walk to move.

The kinetic pairs of the metatarsal branch chain are numbered in the following way: the kinetic pair connected to the base platform is the first one, the kinetic pair connected to the first one is the second one, and so on.

In order to avoid that the hybrid-connection walking robot cannot move or cannot be converted to a walking state in a side-standing state, a big ring is connected to the pelvis of the hybrid-connection double-sided walking robot. The center of the ring is in the same position as the center of the pelvis. The diameter of the big ring is greater than the diameter of the circumcircle of the toe triangle.

Therefore, a robot that cannot stand on its side and can be converted into a walking state when the body is turned over is provided.

The big ring includes circular rings, oval rings, convex polygons, and partially discontinuous rings. When a side-standing condition occurs, the ring forms three support points with the two toes. When the three support points (forming a ring-foot triangle or polygon) touch the horizontal ground, and the projection of the center of gravity of the robot body on the horizontal plane falls outside the ring-foot triangle or polygon. The robot body will fall down. Three or six toes return to the ground and resume the walking ability of the robot. For a non-circular big ring, the radius refers to the distance from the edge of the ring to the center of the pelvis.

Polygonal or discontinuous rings can only be used for purposes of preventing side-standing. The circular ring has the function of preventing side-standing and the function of rolling movement. The circular ring configuration is better than the polygon configuration and also better than the discontinuous configuration.

The role of the circular ring is described below. The robot body cannot stand on its side, it can fall in two directions and resume the walking function. If in extreme cases the robot body can only stand on its side (for example, it cannot stand on a steep slope of sixty or seventy degrees or more, it cannot roll down), the robot can roll to move away from steep slopes and resume walking. Therefore, a robot capable of walking on both sides and capable of rolling to move can be provided.

In order to improve the passability of the double-sided walking robot with a big ring and reduce the lateral size during normal walking, the big ring is an expandable and shrinkable ring. Any expandable mechanism that makes the big ring larger and smaller can be applied to the expandable and shrinkable ring. Document 1 has a configuration that can be made reference to.

In order to provide a leg mechanism that can walk and can move by wheels, the toes of at least one leg mechanism are all toes formed by wheeled rotational pairs, and the axes of the wheeled rotational pairs are parallel to the plane of the base platform. There are locking or braking devices on the wheels. The wheeled rotational pairs can form a steering wheel and an orientating wheel, and the axis of the orientating wheel is perpendicular to the forward direction.

When the three metatarsal branch chains have different DOFs, or when only one or two branch chains are used to change the toe spacing, the position of the center of gravity of the toe triangle (relative to the original toe triangle) may change greatly. This adds difficulty to control. If the toes on the three metatarsal branch chains can all move independently, there will be more DOFs (active pairs).

In order to solve this problem, a transmission box is designed and installed on the base platform. The transmission box has one input end, two or three output ends, each output end being connected to a metatarsal branch chain.

Two or three outputs have translation or rotation directions that face towards each other or face away from each other. The shape of the transmission box is consistent with the whole or a part of the base platform. The upper side of the metatarsal branch chain is connected to the output end. The base platform of the transmission box does not affect the independent movement of the other base platform.

Translation or rotation directions that face towards each other or face away from each other are defined in the following way. When there is a certain input at the input end, if the distance between the toes on the metatarsal branch chains connected to the two or three output ends becomes smaller, it is called movements towards each other. When there is another certain input at the input, if the distance between the toes becomes larger, it is called movements away from each other. For example, movements towards the center are movement towards each other.

The transmission box has the same or similar shape as a part or the whole of the base platform. With two output ends, the shape of the transmission box is consistent with the shape of the base platform; with three output ends, the shape of the transmission box is consistent with the overall shape of the base platform.

Embodiments of a transmission box having two output ends include: driving the metatarsal branch chain with a PHRHP drive chain. The R pair of the PHRHP drive chain is the active pair, and the two H pairs have opposite spiral directions. When the rotational pair is active in one direction, the output ends of the two translational pairs either become close to each other or away from each other. The purpose of one rotational pair to adjust two toes is achieved.

Embodiments of a transmission box having three output ends will be described below. Take the Y-shaped base platform as an example. The transmission box is Y-shaped. One input end is in the middle, the input end is meshed with two gears respectively, the input end is a driving gear, and the other two gears are passive gears. There are three end gears installed at the outermost ends of the Y-type transmission box. The middle driving gear drives one end gear, and the other two passive gears drive the other two end gears. The axes of the six gears are on a horizontal plane. Each of the three end gears is connected to a metatarsal branch chain. With one input on the active end, the three toes either become close or far away. The purpose of adjusting the distance between three toes by a rotational pair is achieved.

The role of the transmission box is to synchronize the movement of two or three toes and change the relative position of the toes. The triangle makes a certain symmetrical change, and the position of the center of gravity is small, which is convenient for control. The design of the transmission box is a well-known technology, and there are various configurations, so it will be not described here.

Some terms and related structures will be described now in detail.

About foot parallel mechanism:

The foot parallel mechanism is not only an independent leg mechanism, but also an important component of the hybrid-connection leg mechanism.

The main function of the foot parallel mechanism is to provide a rotational DOF about X-axis, a rotational DOF about Y-axis, and a translational DOF in Z-direction. Multi-DOF branch chains can also change the toe spacing, providing horizontal translational DOFs. The wheeled branch chain has two functions: wheeling (running on wheels) and walking. Therefore, the main role of the foot parallel mechanism is: 1) on various uneven surfaces, it can keep the robot body level or a certain fixed posture to walk, 2) realizing the lifting movement.

The foot parallel mechanism is classified according to its DOFs, and there are two-DOF, three-DOF, and up to nine-DOF foot parallel mechanisms. If redundant DOFs are added, there will be even more types.

About metatarsal branch chain:

The metatarsal branch chain is a branch chain connected to the base platform and is the support between the base platform and the ground. It is a branch chain with a specific combination of DOFs. It is equivalent to the metatarsal bone between the toes and ankles of animals. Unlike the metatarsal bone, the metatarsal branch chains can vary in length, angle, etc.

The metatarsal branch chains are classified into five types: zero-DOF metatarsal branch chain (at most one for each foot parallel mechanism), single-DOF metatarsal branch chain (Tz DOF), and two-DOF metatarsal branch chain (TzTx, TzTy, TzRx, TzRy DOF combination), three-DOF metatarsal branch chain (TzTxTy, TzTxRx, TzTyRy, TzRxRy DOF combination), metatarsal branch chain with wheels (including steering wheels and orientating wheels; a wheeled metatarsal branch chains has up to 5 DOFs).

The three metatarsal branch chains can be the same branch chain or different branch chains. Each of the three metatarsal branch chains occupies an independent working space without interference with each other.

A zero-DOF metatarsal branch chain is a rod. A zero-DOF metatarsal branch chain cooperates with two single-DOF metatarsal branch chains to form a foot parallel mechanism and a standing leg mechanism. This leg mechanism has no translational DOF in Z-direction and has no lifting function. A walking robot with such a leg mechanism can only perform intermittent wave-like up-down motions.

A single-DOF metatarsal branch chain has only one translational DOF in Z-direction. Three single-DOF metatarsal branch chains form a foot parallel mechanism, and each metatarsal branch chain has a translational DOF in Z-direction (including a DOF having a DOF component in Z-direction). For example, for a metatarsal branch chain composed of a translational pair P, its translational pair axis is perpendicular to the horizontal plane; for another example, for a metatarsal branch chain composed of a rotational pair R or a parallelogram translational pair Pa, its rotational pair axis is parallel to the horizontal plane, and R, Pa pairs have movement component in Z-direction during rotation. It should be noted that it the condition that an R or Pa pair is applied, when the rotation angle of R or Pa is close to 90 degrees, the component in Z-direction is almost zero, and the disturbance space is large when stepping up. However, there are advantages for this configuration: the horizontal component is relatively large and can be used to change the toe spacing.

There is also a single-DOF metatarsal branch chain consisting of two kinetic pairs: PP (the axes of the P pairs coincide), and the second P pair is a passive pair for vibration reduction. There is also a branch chain consisting of three kinetic pairs: RHP (the axes of the three kinetic pairs coincide), forming the DOF of up and down movement, and the driving power is input via the rotational pair.

The foot parallel mechanism formed by a single-DOF metatarsal branch chain composed of a translational pair is a lifting-standing leg with non-adjustable toe spacing. The foot parallel mechanism formed by the single-DOF metatarsal branch chain formed by the rotational pair is a lifting-standing leg with adjustable toe spacing.

About two-translational-DOF metatarsal branch chain:

A two-translational-DOF metatarsal branch chain consisting of single-DOF pairs may be, for example, two translational parallelogram-type complex kinetic pairs (including 2-RPR parallelogram-type complex kinetic pairs and 3-UU parallelogram-type complex kinetic pairs, also known as two-dimensional pure translational universal joint). A two-DOF metatarsal branch chain composed of two kinetic pairs may be, for example: PP (the axes of the two P pairs are perpendicular to each other), RP, RR, PaP, PC, PaPP, PaR, RC. A two-DOF metatarsal branch chain composed of three kinetic pairs may be, for example, PPP (the axes of the first two P pairs are perpendicular to each other, and the axes of the second two P pairs coincide), PCC, PaPP. The last kinetic pair is a passive pair for vibration reduction.

The foot parallel mechanism formed by a two-DOF metatarsal branch chain is a lifting-standing leg that can change the toe spacing. In addition to increasing the choice range of the toe point, the metatarsal branch chain with two translational DOFs can also increase the stride and increase a Tx DOF to the foot parallel mechanism. It can accelerate the walking speed in the forward direction and improve the ability to cross the trench. For thigh mechanisms with a Tx DOF, the Tx DOF is a redundant DOF.

For the three-translational-DOF metatarsal branch chains, the translational DOFs may be combined as TxTyTz, RxTzTx, RyTzTy, RxRyTz.

The three-DOF metatarsal branch chain consisting of a single kinetic pair has a three-direction translational universal joint M; three-DOF metatarsal branch chains consisting of a double-kinetic pair include UP branch chain, PI branch chain, CP branch chain, or U*P branch chain; three-direction translational parallel mechanisms include 3-UPU; serial mechanisms include RRR, PPaP. The foot parallel mechanism formed by the three-DOF metatarsal branch chain is a lifting-standing leg that can change the toe spacing.

For the three-translational-DOF metatarsal branch chains, it can select a fall-toe point within a larger range (two dimensions), which can increase the stride. The three-DOF metatarsal branch chains, in addition to enlarging the selection scope, can also accelerate the walking speed in the forward direction and the lateral direction to improve the ability to cross the trench.

The metatarsal branch chain mainly uses series mechanisms. Sometimes the parallel mechanism can also be applied, but the structure is complex and the working process has a large disturbance space. The three-translational-DOF metatarsal branch chains, if used in parallel, will be more complicated and will increase the weight of the legs. However, they have a higher carrying capacity.

The two- or three-DOF metatarsal branch chains, regardless of whether the robot body is horizontal or inclined, can be controlled with its axis perpendicular to the ground, optimizing the state of stress. At the same time, under the same structure size, the uphill ability is improved (increased by 5-10 degrees).

In addition to the above mentioned branch chains with independent DOFs, the metatarsal branch chains include interrelated metatarsal branch chains. The interconnected metatarsal branch chains can achieve a certain symmetrical movement of the toes with fewer DOFs, which not only changes the toe spacing, but also does not cause the position of the center of gravity to change greatly.

In order to improve the moving speed on the structural road surface, a wheel is installed on the toe, that is, a wheeled rotational pair Rw is installed; the wheel axis is parallel to the base platform plane, and the orientating wheel axis is perpendicular to the forward direction. The wheels include two types—with and without a steering DOF. Embodiments of metatarsal branch chains with wheels are: PRw, PPRw, PPPRw, RPRw, RPPRw, RRw, RRRRw, RRPRw, RPRw, PaRw, PaRRw, PaPRw, PaPPRw, PPRw. The metatarsal branch chain with steering wheels has a maximum of 5 DOFs.

The base platform is connected to the three metatarsal branch chains to form a complete foot base platform. The height of the foot base platform is variable; the distance between the toes is also variable in some metatarsal branch chains.

In the metatarsal branch chain, if the axes of the two P pairs coincide, there is a negative pair for vibration reduction. If the axes of the two P pairs are perpendicular to each other, then there are two active pairs, constituting a branch chain having two DOFs.

The meaning of the above mentioned symbols: U represents Hook hinge, P represents generalized translational pair, R represents rotational pair, Rw represents wheeled rotational pair (that is, wheel), C represents cylindrical pair, H represents spiral pair, Pa represents parallelogram pair, U* and I represent bidirectional-translational parallelogram complex kinetic pairs, also known as bidirectional pure translational universal joints, and M represents three-direction-translational parallelogram-type complex kinetic pair.

Regardless of the type of metatarsal branch chain, the toe triangle should be as large as possible to obtain a larger stability range.

The greater the change in the length of the metatarsal branch chain, the stronger the climbing ability. To provide the ability to climb, the metatarsal branch chain should increase the amount of change in movement. For example, multiple joints can be used to increase the amount of movement.

For the connection of the metatarsal branch chain to the base platform, attention should be paid to the relationship between the axis of the first kinetic pair and the plane of the base platform. For example, when the P pair or RHP is used as the metatarsal branch chain, the axis of the first pair is perpendicular to the plane of the base platform; when PP (one P is perpendicular to another P) or PR is used as the metatarsal branch chain, the axis of the first pair is parallel to the plane of the base platform; when RP or RPP is used as the metatarsal branch chain, the axis of the first kinetic pair is parallel to the plane of the base platform.

About toes:

The three toes are not collinear, usually on the three vertices of a regular triangle or an isosceles triangle. Naturally, the connection points of the three metatarsal branch chains to the base platform are also not collinear.

There are various structural forms of toes. In order to work on special surfaces such as ceilings and walls, suction cups, electromagnets, etc. can be installed on the toes. In order to reduce the impact when landing, and improve the stability of the walking robot, an elastic vibration damping device is installed at the lower part of the toes. For example, a toe is installed with an elastic pad; or a negative translational pair is installed at the end of the metatarsal branch chain, and a kinetic pair type shock absorber is installed. The shape of the lower end of the toe is preferably hemispherical or ellipsoidal. This shape can be suitable for various road surfaces. The wheel is also a special toe. A ranging sensor and a pressure sensor or the like can also be installed under the toe.

About thigh mechanism:

The thigh mechanism is a mechanism having a certain DOFs and a combination of DOFs.

There are 6 types of single-DOF thigh mechanisms, four of which do not have Rx or Ry DOF; there are 14 types of two-DOF thigh mechanisms, six types of which have no Rx or Ry DOF; there are 9 types of combined three-DOF thigh mechanisms, of which there are 3 types of thigh mechanisms that have no Rx or Ry DOF; there are 5 types of four-DOF thigh mechanisms, of which there is one type of thigh mechanism that has no Rx or Ry DOF; there are two types of five-DOF thigh mechanisms, neither of them having Rx or Ry DOF.

In thigh mechanisms with various combinations of DOFs (including single-DOF), there are 14 types of thigh mechanisms without Rx or Ry DOF; there are 22 types of thigh mechanisms including Rx or Ry DOF. In the 14 thigh mechanisms without Rx and Ry DOFs, there are single-DOF thigh mechanisms as well as 10 other types of thigh mechanisms. These 10 types of thigh mechanisms can be parallel or series. There are 4 types of 3-DOF and 4-DOF thigh mechanisms, and these four types can also be hybrid-connection mechanisms. In the ten types of thigh mechanisms without Rx and Ry DOF, there are thigh mechanisms containing Tz DOF as well as four other types of mechanisms that are all planar thigh mechanisms.

The thigh mechanisms containing Rx or Ry DOF have advantages in special occasions. For example, in most working situations the road is inclined, and sometimes the robot body requires a horizontal attitude.

The thigh mechanism can be a series mechanism, a parallel mechanism, a hybrid-connection linkage mechanism or a single kinematic pair. For the thigh mechanism with multiple branch chains, the same branch chain or different branch chains can be applied. Leg mechanism A may have no or only one rotational DOF about a horizontal axis. Rx DOF and Ry DOF cannot appear in a thigh mechanism at the same time.

If the thigh mechanism has two or more branch chains, each branch chain should not interfere with each other. This is also a condition that a mechanism must meet.

The thigh mechanism may be a spatial mechanism, a hybrid-connection mechanism, a planar mechanism, or a single kinetic pair, which will be discussed separately below.

Spatial mechanism: its DOF combination includes 3TRz, 3TOR. 3TRzRx, 3TRzRy, 3TRx, 3TRy.

There are many structural forms of spatial mechanisms. Space parallel mechanisms include: 3TOR mechanism, such as (3-UPU), (3-PUU), (3-CPP) mechanism, etc.; 3TRz mechanism, such as 4-UPU parallel mechanism.

A hybrid-connection mechanism may be, for example, a combination of DOF (3TOR)Rz, (3TRz)Rz, Rz (3TRz), (3TRz)Rx, (3TRz)Ry, (3T)Rx, (3T)Ry, (TxTy)Rz, (TxTyRz) Rz and the like. The above mentioned spatial mechanisms or the planar mechanisms that will be described below may be connected in series with a rotational pair Rz. The rotational DOF around Z-axis allow redundant DOFs.

The planar mechanism has a variety of DOF combination, including TxTyRz, TxTzRz, TyTzRz, TxTy, TxTz, TyTz, TxRz, TyRz, and TzRz. The mechanism thus constructed comprises a parallel mechanism and a series mechanism. As an example, parallel mechanisms: 3-RRR, 3-RPS, 3-RPR, 3-RPR, 3-PRP, 3-PaPaRz mechanism, etc. As another example, series mechanisms: RRR, RPR, PaPaRz mechanism. Further, there are PRz, RzU*, (CC)Rz mechanisms, etc. These planar parallel mechanisms can be applied to the present invention.

The mechanism formed by a single kinematic pair is relatively simple. For example, Tx is formed by a P pair, Ty is formed by a P pair, Rz is formed by an R pair, and TzRz is formed by a C pair. Single DOF kinetic pairs I, M, U* are also feasible.

A thigh mechanism with three DOFs, Tx, Ty and Rz, is called a full DOF thigh mechanism; in addition to Tx, Ty and Rz DOF, a thigh mechanism with other DOFs is called a redundant DOF thigh mechanism; A thigh mechanism without any one of Tx, Ty and Rz DOFs is referred to as a low DOF thigh mechanism. For example, a thigh mechanism having Tx, Ty and Tz DOF is referred to as a low DOF thigh mechanism.

The thigh mechanisms are classified into steering thigh mechanism, unidirectional stepping thigh mechanism, bidirectional stepping thigh mechanism, unidirectional stepping thigh mechanism, bidirectional stepping thigh mechanism, and redundant DOF thigh mechanism.

In various thigh mechanisms, the principle of selecting a thigh mechanism is that: a parallel mechanism is better than a series mechanism; a mechanism without Rx, Ry is better than a mechanism containing one Rx or Ry; in some cases, a mechanism without Tz is better than a mechanism containing Tz; in some cases, a hybrid-connection mechanism is better than a parallel mechanism; in some cases, a planar parallel mechanism is better than a spatial parallel mechanism; in some cases, a redundant branch chain parallel mechanism is better than a full (just full) branch chain parallel mechanism (a parallel mechanism with the same number of DOFs as the number of branch chains).

About hybrid-connection leg mechanism:

The construction of a hybrid-connection leg mechanism is a process to connect a foot parallel mechanism with a thigh mechanism. Any one foot parallel mechanism and any thigh mechanism, as long as they share the same base platform, can constitute a hybrid-connection leg mechanism.

The purpose of constructing the hybrid-connection leg mechanism is to enable the foot parallel mechanism to obtain the stepping and steering functions. The connecting part of the thigh mechanism and the foot parallel mechanism is the base platform, and the two share the same base platform. Simply speaking, a thigh mechanism and a foot parallel mechanism that are connected together and share a common base platform is a hybrid-connection leg mechanism.

In addition to the Rx, Ry and Tz DOFs of the foot parallel mechanism, the thigh mechanism also has at least one DOF selected from the following three DOFs: 1) DOF Tx of movement in the forward direction, 2) DOF Ty of lateral movement, and 3) DOF Rz of rotation around Z-axis.

The standing and lifting functions of the parallel foot mechanism cooperate with the translational DOF in the forward direction of the thigh mechanism to complete the stepping function in the forward direction; the standing and lifting functions of the parallel foot mechanism cooperate with the DOF of lateral movement of the thigh mechanism to complete the stepping function in the lateral direction; the standing and lifting functions of the foot parallel mechanism cooperate with the steering motion DOF of the thigh mechanism to complete the steering function.

The best hybrid-connection leg mechanisms have six or more DOFs. The main functions of the hybrid-connection leg mechanism include standing, stepping and steering functions. The hybrid-connection leg mechanism has unidirectional stepping legs, bidirectional stepping legs, steering legs, unidirectional stepping-steering legs, full-function legs, adjustable toe spacing legs, and so on.

The hybrid-connection leg mechanism allows for other redundant DOFs. The present invention eliminates the situation that Rx and Ry DOFs are simultaneously redundant. A single Rx, Ry DOF redundancy is allowed. Redundancy in other DOFs is also allowed.

The redundant DOF hybrid-connection walking robot includes two configurations.

In the condition that the thigh mechanism has redundant DOFs, there are two configurations. 1) If there is Tz, Rx or Ry DOF in the thigh mechanism, they will coincide with the DOFs of the foot parallel mechanism, forming a redundant DOF. For example, if 3TRz or TxRx is applied to the thigh mechanism, TTR DOF redundancy appears in 3TRz, and Rx DOF redundancy appears in TxRx. 2) The thigh mechanism itself has redundant DOFs. For example, if the thigh mechanism uses a 3-DOF planar mechanism in series with another Rz, Rz will have a redundant DOF. A hybrid-connection leg mechanism with redundant DOF thigh mechanism must be a redundant DOF hybrid-connection leg mechanism.

In the condition that the foot parallel mechanism has redundant DOFs, there are two configurations. 1) In a foot parallel mechanism, if the metatarsal branch chains are all of two DOF or three DOF type, the foot parallel mechanism has Ty or Tx DOF. If the matching thigh mechanism also has Ty or Tx DOF, there will be redundancy in Ty or Tx DOF. 2) The metatarsal branch chain has its own DOF. For example, in the metatarsal branch chain, there are two translational pairs (or cylindrical pairs) with coincident axes. One of them serves as a shock absorber (passive pair). As another example, the three rotational pairs with parallel axes are used as the metatarsal branch chain, and the lowest rotational pair is a passive pair. When used as a shock absorber, there is also a redundant DOF (see FIG. 5). A hybrid-connection leg mechanism with redundant DOF foot parallel mechanism must be a redundant DOF hybrid-connection leg mechanism.

The redundant DOF hybrid-connection leg mechanism does not affect the application of the leg mechanism. In some cases it is still a good thing.

About connection of the two leg mechanisms and about pelvis:

It is not that any two hybrid-connection leg mechanisms or a hybrid-connection leg mechanism connected to a foot parallel mechanism can form a hybrid-connection walking robot. For example, the two leg mechanisms in FIG. 18 cannot form a walking hybrid-connection robot, because this robot has no steering ability. In addition to the requirements on the two leg mechanisms, the structure must also meet certain other requirements.

Two full DOF hybrid-connection leg mechanisms can be combined into a hybrid-connection walking robot. A full DOF hybrid-connection leg mechanism and a low DOF leg mechanism or foot parallel mechanism can also be combined to form a hybrid-connection walking robot. Two leg mechanisms with low DOFs can form a hybrid-connection walking robot only when they meet a certain DOF requirements. Sometimes, the horizontal DOF of the foot parallel mechanism can cooperate with the thigh mechanism to realize walking movement. But this is not the best option. For example, a steering thigh mechanism with a unidirectional toe-pitch adjustable foot parallel mechanism constitutes a hybrid-connection leg mechanism. Two such hybrid-connection leg mechanisms can constitute a hybrid-connection walking robot. Obviously, this is not a good solution. However, with such a redundant DOF, the walking robot can also rely on this redundant DOF to walk when the translational DOF of the thigh mechanism fails, which is a potential benefit.

The pelvis formed after the two leg mechanisms are connected is also used to install the body (robot body) and the manipulators.

Naturally, when connecting two hybrid-connection leg mechanisms, the toes of both leg mechanisms should be below, and the dimensions of the two leg mechanisms should be approximately the same.

The connected two thigh mechanisms form a structure having one, two or more layers: they are mainly divided into several configurations.

One-layer structure: the pelvis, the leg A thigh branch chain and the leg B thigh branch chain, the leg A base platform and the leg B base platform are all on the same layer.

Two-layer structure: one layer of the pelvis, the leg A thigh branch chain and the leg B thigh branch chain on the same layer as the pelvis, the leg A base platform and the leg B base platform on the same another layer. For example, RPR branch chains are used for leg mechanisms (see Embodiments 2, 3 and 4). The two-layer structure also includes a hybrid-connection walking robot formed by combining a hybrid-connection leg mechanism and a foot parallel mechanism. There is one type of leg mechanism without thigh branch chains. The base platform of the foot parallel mechanism and the upper platform of the hybrid-connection leg mechanism constitute one layer. The base platform of the hybrid-connection leg mechanism forms the other layer. There are totally two layers.

Three-layer structure: one layer of pelvis, the leg A thigh branch chain and the leg B thigh branch chain on the same layer as the pelvis, the leg A base platform on the second layer, and the leg B base platform on the third layer. For example, that disclosed in Embodiment 1 can be used.

Four-layer structure: in order to increase the activity space, the leg A thigh branch chain (including the pelvis) occupies a separate layer. The leg B thigh branch chains (including the pelvis) also occupy a separate layer. The thigh branch chain of the two leg mechanisms allows a relatively large disturbance space, the leg A base platform is on the third layer, and the leg B base platform is on the fourth layer. With this structure, the two pelvises are connected as one body.

If the upper platform of a thigh mechanism and its branch chain each occupy one layer, a hybrid-connection walking robot may have six layers.

For two base platforms, one high and one low, or one inside and one outside, or one forwards and one backwards, usually only one of the requirements of no interference with each other needs to meet. The base platform structure can be convex, flat, or concave. The shape of the base platform has a variety of structural forms such as Y, T, O, C, V, U, triangle, and butterfly. These types of structures are only approximate expressions. However, it is not limited to these structural forms. The goal of configuring two base platforms is to prevent the interference of the two base platforms, to provide their respective space for the two base platforms, and to provide their own space for the two metatarsal branch chains. Various shapes that satisfy the base platform design purpose can be used to make the base platform. For the structure and configuration of the base platform, the base platforms (foot arches) disclosed in Document 1 can be used.

The hybrid-connection leg mechanism of the present invention is characterized in that the leg lifting function and moving function are decoupled, so the two functions are not coupled and it is easy to control.

A few notes:

The translational DOF of the metatarsal branch chain refers to the translational DOF of the point of the toe. Therefore, the toes mounted on the rotational pair have a translational DOF. In the combination of DOFs expressed by the alphabet string, the order of the alphabets does not indicate the order of DOFs. For example, Rz(3TOR) is the same as Rz(3TRz), regardless of the order. The exterior of the hybrid-connection walking robot of the present invention can adopt a closed structure, which is used for fireproof, waterproof or radiation-proof occasions. For the drive of the present invention, it is suggested using a remote drive (for example, a fixed motor that uses a toothed belt to achieve remote transmission) to reduce the inertia of the moving parts. Various mechanisms in the present invention should avoid singularities. It is also a feasible solution to configure the hybrid-connection leg mechanism of the present invention with a common leg mechanism. Leg mechanisms, including the leg mechanisms disclosed in Document 1, can be equipped with ordinary bionic leg mechanisms to constitute a walking robot. The invention is a non-bionic walking robot which is featured in the following three aspects. First, the step-moving function and step-lifting function of the hybrid-connection leg mechanism are decoupled, and the steering function and step-lifting function are also decoupled. This is not seen in the animal kingdom. Second, both legs can tolerate each other and intersperse each other. The legs of animals are solid bodies, and they cannot be interspersed or tolerated. Third, the animals have front and back legs, or left and right legs, or front and back legs. The walking robot provided by the present invention does not have front, rear, left and right legs, and only inner and outer legs. Therefore, the present invention is a non-bionic walking robot.

The working process of the hybrid-connection walking robot provided by the present invention is basically the same as the working process of the walking robot of Document 1. Here, the working process of several typical hybrid-connection walking robots is only briefly explained.

The fewer DOFs of a hybrid-connection walking robot, the worse its movement function. With seven DOFs, it can only perform wave-type intermittent movement, intermittent steering (in the condition of a large angle steering), and cannot move laterally. Eight DOFs, according to the combination of DOFs: 1) can only do horizontal intermittent movement, intermittent steering, but cannot move laterally; 2) or can only do wave intermittent movement, continuous steering, but cannot move laterally; 3) can only do wave intermittent movement, intermittent steering and lateral movement. Adding a DOF will improve the robot's walking capabilities. Twelve DOFs can be used for various movements. If the toe spacing can be adjusted, more than twelve DOFs are required, and at this time, it can be adapted to various road surfaces.

The following describes the walking operation process of three types of hybrid-connection walking robots.

Taking embodiment 1 as an example, the working process of an internal-external type full (complete) DOF hybrid-connection walking robot is described.

1) Static stable straight walking: within a gait cycle, when stopped, it is assumed that leg A is in the standing phase and leg B is in a walking position. During walking, the pelvis remains horizontal.

The horizontal movement of the platform on the thigh mechanism of leg A drives leg B to move. The toe triangle of leg B also moves horizontally to achieve the stepping movement. After reaching the predetermined position or the maximum stride, the metatarsal branch chains of leg B are lowered, and the three toes touch the ground according to the height of the ground, the leg B bears the load. Then, leg B is switched into a standing phase. Then, each metatarsal branch chain of leg A is lifted (shortened), and leg A is switched into a movable phase. By the horizontal movement of the platform on the thigh mechanism of leg B, leg A is driven to move. At the same time, the toe triangle of leg A also moves horizontally in the same direction to achieve the stepping movement. After reaching the predetermined position or the maximum stride, metatarsal branch chains of leg A extend down (lengthened), the three toes touch the ground according to the height of the ground, leg A bears the load, and then leg A is switched into the standing phase again. In this way, a cycle is completed. By repeating the above process, straight horizontal walking movement is achieved.

The actual working process shows that the adaptation of the present invention to uneven roads is completely completed by the foot parallel mechanism; the task of lifting the legs is mainly completed by the foot parallel mechanism. Only when a Tz DOF exists in the thigh mechanism, the task of lifting the legs is completed jointly by the foot parallel mechanism and the thigh mechanism, but the thigh mechanism only plays a minor role; the movement and steering functions are mainly performed by the thigh mechanism. Only when there are two or three DOFs in the branch chains of the foot parallel mechanism, the tasks of stepping and steering are jointly performed by the foot parallel mechanism and the thigh mechanism, but the stepping moving function of the foot parallel mechanism only plays a minor role.

2) Static stable steering: when stopped, it is assumed that leg A is in the standing phase and leg B is in a movable phase.

The toe triangle of leg B in the movable phase is rotated relative to the upper platform. If the requirement is not met, the upper platform is rotated in the same direction under the driving of the leg A which is in the standing phase. When the required steering angle or the maximum steering angle is reached, the toes of movable leg B are lowered down, and each toe touches the ground according to the height of the ground. Leg B is switched into the standing phase, and leg A is switched into the movable phase. Leg B in the standing phase is rotated by another angle, and leg A in the movable phase is rotated by another angle to achieve the required steering angle. If the angle is insufficient, the above process can be repeated for continuous steering. During the steering process, the center of gravity of the robot does not change, and it is always within the stable triangle formed by the three toes of the leg mechanism.

3) Static stable simultaneous straight walking and steering at the same time: since the center of gravity of the robot does not change during steering, the walking robot can perform steering while walking straightly. In this way, steering while walking straight is achieved.

In this gait, the maximum steering angle and the maximum step length of a gait will be both appropriately reduced.

4) Dynamic walking:

When moving forward, the robot does not need to adjust the position of the center of gravity left or right even if the center of gravity of the robot momentarily exceeds the stable triangle range of the leg legs. For example, if leg A is in a movable phase and leg B is in a standing phase, as long as the leg B exerts a force on the ground, the upper platform can obtain a large forward and slightly upward speed, the center of gravity shifts forward quickly, and leg A lands quickly so the gravity falls completely on leg A. Leg A becomes standing, leg B is raised, leg B becomes movable, and dynamic walking can be achieved.

Therefore, no matter it is steady walking or dynamic walking, the robot should not adjust its center of gravity in the horizontal direction.

Internal and external walking robots are isotropic. Without steering, when walking in all directions, the movement method is basically the same as the above process, and will not be described in detail.

Taking embodiment 3 as an example, the working process of the cross-type walking robot will be described.

1) Static stable straight walking:

When stopped, it is assumed that inner leg A is in the standing phase and outer leg B is in the movable phase. The center line of the two toe triangles is taken as the forward direction.

Walking in the forward direction, the toes of leg B are extended forward, and the upper platform of leg A is driven to move in the same direction at the same time, so the upper platform moves forward, the center of gravity moves forward, the toes of leg B move forward, and finally reach the required step length. When the maximum step length is reached, the toes of leg B fall to the ground and bear the load. The center of gravity is shifted from leg A to leg B. Leg B is in the standing phase, leg A is lifted and retracted, and leg A is switched into the movable phase. The upper platform continues to move forward, the center of gravity continues to move forward, and the center of gravity moves to the center of the leg B. Leg B is switched into the standing phase and starts the next step, so the next cycle is started.

2) Static stable steering: Leg B in the movable phase is rotated relative to the upper platform. If it fails to meet the requirement, the upper platform is driven in the same direction by the leg A in the standing phase. When the required steering angle or the maximum steering angle is reached, movable phase B is lowered to be switched into the standing phase, leg A in movable phase is turned into the standing phase, and the leg in the standing phase is rotated another angle to achieve the required steering. If the angle is insufficient, the above process is repeated and the steering is continued. During the steering process, the center of gravity of the robot does not change, and it is always within the stable triangle formed by the three toes of the leg mechanism.

Embodiment 7 is used as an example to describe the working process of an internal-external type eight-DOF hybrid-connection walking robot.

This is one of the hybrid-connection robots with the least DOFs. This hybrid-connection walking robot can only perform intermittent walking motions. Leg B is used for unidirectional stepping and steering, and leg A can perform standing and lifting functions. Leg B can conduct steering while moving, and can also take a step while steering. The walking process is described as follows. Leg A is in the standing phase, the robot body's center of gravity is basically unchanged, leg B is lifted and moved, and then lowered; leg B bears the body load and lifts the upper platform, leg B is switched into the standing phase, leg A is lifted, and the robot body is driven forward under the driving of leg B, and after reaching the new position, leg A extends down, touches the ground, and bears the load, leg A is switched into the standing phase again, leg B retracts, leg B becomes movable, and the next cycle begins to achieve continuous walking.

The steering process of this low DOF walking robot is also intermittent. The process can be understood with reference to the steering working process of the full (complete) DOF hybrid-connection walking robot, which is not described in detail.

The present invention has various excellent embodiments. In order to introduce the various configurations more clearly and comprehensively, various structural configurations of the foot parallel mechanism will be explained first, and then the various configurations of the hybrid-connection parallel mechanism will be explained. Finally, several typical hybrid-connection walking robot embodiments will be described.

Foot parallel mechanism (lifting-standing legs):

The foot parallel mechanism is not only an indispensable mechanism for the hybrid-connection leg mechanism, but also one of the optional leg mechanisms for the leg mechanism of the hybrid-connection walking robot. So, it is a very important mechanism. The foot parallel mechanism is classified according to the DOFs of the metatarsal branch chains as: standing legs, lifting-standing legs, unidirectional toe-spacing-adjustable lifting legs, bidirectional toe-spacing-adjustable lifting leg mechanisms, wheeling legs, rolling legs, etc. The height of the toe triangle can be defined as the foot length, and the bottom side is defined as the foot width.

The following are several typical configurations of a foot parallel mechanism.

FIGS. 1-4 are perspective views of four different foot parallel mechanisms.

The foot parallel mechanism is independently used as a leg mechanism. In most cases, it can only be combined with a hybrid-connection leg mechanism that has both stepping and steering functions to form a hybrid-connection walking robot.

FIG. 1 is a perspective view of the first type of foot parallel mechanism 1. Its base platform (like a foot arch) 1.1 is a circular base platform, and each of its metatarsal branch chains 1.2 is a translational pair. The axis of the translational pair is perpendicular to the plane of the base platform. A toe 1.3 is provided at the lower end of each metatarsal branch chain. The spacing between toes 1.3 cannot be adjusted. This is a lifting-standing leg with three DOFs. If the metatarsal branch chain in the lower right corner is replaced by a rotational pair, and the axis of the rotational pair is perpendicular to the direction of advance, the toe spacing can be changed.

Figure 2:
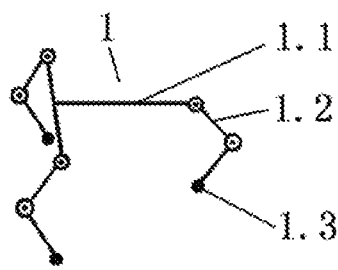

FIG. 2 is a perspective view of a second type of foot parallel mechanism 1. Its base platform 1.1 is a T-shaped base, and three metatarsal branch chains 1.2 each comprise two rotating joints connected in series and having two DOF. The three metatarsal branch chains have six DOFs. The axes of the first rotational pairs are parallel to each other. Lower ends of the metatarsal branch chain are provided with toes 1.3, and the distance between the toes 1.3 can be adjusted. The metatarsal foot parallel mechanism has one DOF in the forward direction.

Figure 3:
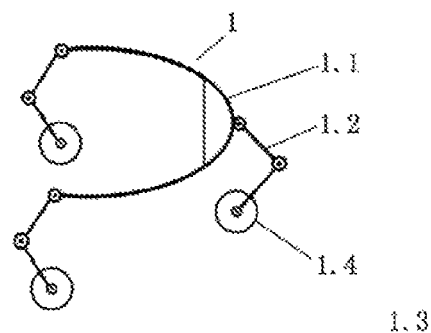

FIG. 3 is a perspective view of a third type of foot parallel mechanism 1. Its base platform 1.1 is a C-shaped base, and its metatarsal branch chains 1.2 each comprise two rotating joints in series. Each metatarsal branch chain has two DOFs, and the distance between the toes 1.3 can be adjusted independently; each toe is equipped with a wheeled rotational pair (wheel) 1.4, the axes of the wheels are parallel to each other, and at least one of the three wheels is a steering wheel. This is a lifting-standing leg the toe spacing of which can be adjusted independently and which can run on wheels. The metatarsal branch chains of this foot parallel mechanism can also be turned over the base platform. When the robot flips by 180 degrees, it still has the ability to walk and run on wheels.

Figure 4:
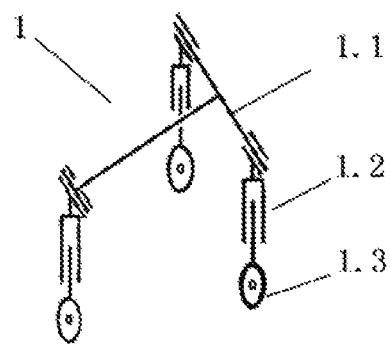

FIG. 4 is a perspective view of a fourth type of foot parallel mechanism 1. Its base platform 1.1 is a T-shaped base, and its metatarsal branch chains 1.2 are each an RP branch chain. The two axes of motion are perpendicular to each other, and each metatarsal branch chain has two DOFs. Toe spacing can be adjusted independently; wheels 1.4 are installed on the toes, the axes of the orientating wheels are parallel to each other, and at least one of the three wheels is a steering wheel. This is a lifting-standing leg the toe spacing of which can be adjusted independently and which can run on wheels. This metatarsal branch chains can also be turned over the base platform. In this way, when the robot is turned by 180 degrees, the robot can still walk or run on wheels.

Figure 5:
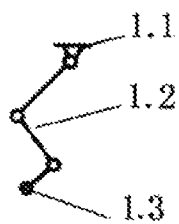
FIG. 5 is a simplified diagram of a metatarsal branch chain with redundant DOFs.

FIG. 5 shows a metatarsal branch chain with a negative rotational pair. The metatarsal branch chain is composed of three rotational pairs, and the axes of the three rotational pairs are parallel to each other. There are two DOFs and one redundant DOF. The bottom rotational pair is a passive pair for vibration reduction. Reference numerals are the same as in FIG. 1.

Figure 6:
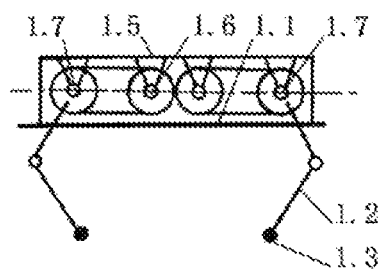
FIG. 6 is a schematic diagram of the transmission of two interrelated metatarsal branch chains.

FIG. 6 shows an example of transmission of a transmission box with two output ends. T-shaped base platforms 1, 1 are used as installation platforms. Transmission box 1.5 has an elongated shape and is mounted on the "transverse portion" of the T-base platform. Two gears are provided in the middle, one is the driving gear, acting as input end 1.6, and the gear meshing with it is the passive gear, and the two gears rotate in opposite directions. There are two gears installed at the two ends of the transmission box. There are two output ends 1.7. The middle driving gear drives one end gear, and the middle passive gear drives the other end gear. The axes of the four gears are horizontal and parallel to each other. The directions of rotation of the two end gears are opposite. Each of the two end gears is connected to a metatarsal branch chain 1.2 (RR). The gear shafts at both ends are the first rotational pairs of the two metatarsal branch chains. These two rotational pairs are correlated. There is a rotational pair drive. When there is one input on the active end, two toes 1.3 are either become close or far away. The purpose of one rotational pair adjusting two toes 1.3 is achieved. With this transmission box, as long as there are 4 or 5 DOFs, the purpose of changing toe spacing and foot size can be achieved.

The transmission chain of this transmission box can also be changed to PHRHP. The middle rotational pair is the active pair and the two translational pairs are the output ends. The two screw pairs have opposite thread directions. The spacing of the three toes 1.3 can be adjusted independently.

Hybrid-connection leg mechanism:

The hybrid-connection leg mechanism is composed of a thigh mechanism and a foot parallel mechanism. The thigh mechanism will be explained here first.

According to the DOFs of the thigh mechanism, the thigh mechanism is classified as: single-DOF thigh mechanism, two-DOF thigh mechanism, three-DOF thigh mechanism, redundant DOF thigh mechanism (a thigh mechanisms containing Rx, Ry, Tz DOFs is called a redundant DOF thigh mechanism).

FIGS. 7 to 17 are schematic diagrams of several different thigh mechanisms.

Figure 7:
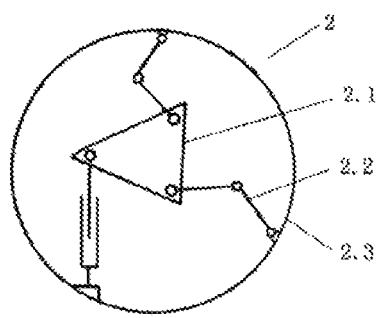
FIG. 7-16 are top views of ten different thigh mechanisms.

FIG. 7 is a simplified diagram of a two-DOF (1TxRz) thigh mechanism 2. Its thigh base platform 2.3 (lower platform) is a circular base platform, the upper platform 2.1 is a triangular platform; there are three thigh branch chains 2.2 forming two DOFs (1Tx1Rz); one branch chain is a redundant branch chain; the three thigh branch chains 2.2 include a PR branch chain and two RRR branch chains.

Figure 8:
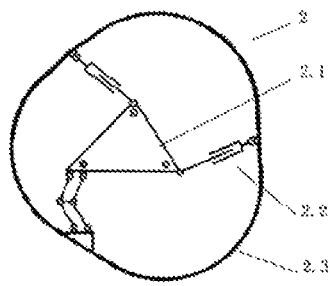
Figure 9:
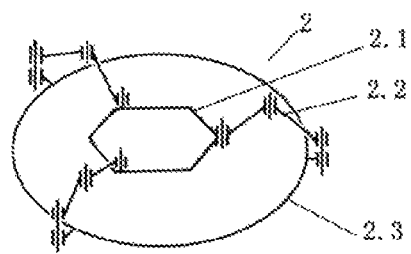

FIG. 8 is a simplified diagram of another two-DOF (TxTy0R) thigh mechanism 2. The thigh base platform 2.3 (lower platform) is a butterfly base platform, the upper platform 2.1 is a triangular platform; three thigh branch chains 2.2 form two DOFs (TxTy0R); one branch chain is a passive branch chain; the three thigh branch chains 2.2 comprise one PaPa branch chain and two RPR (or RPS) branch chains.

Figure 10:
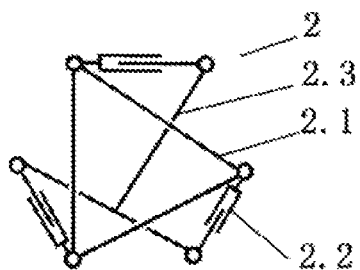
Figure 11:
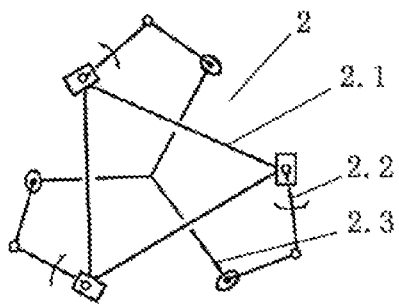
Figure 12:
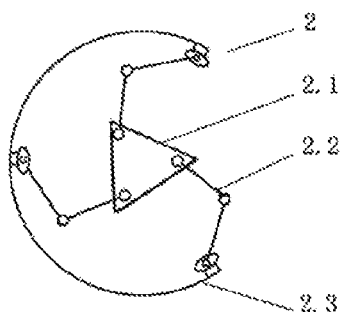

FIGS. 9, 10, 11 and 12 are simplified diagrams of three kinds of thigh mechanisms 2. Three thigh mechanisms 2 are full DOF planar parallel mechanisms to form three DOFs (TxTyRz); the thigh branch chain 2.2 of FIG. 10 is an RPR branch chain, and the remaining thigh branch chains 2.2 are RRR branch chains. The upper platforms 2.1 are in the forms of a hexagon platform and a triangle respectively, and the thigh base platforms 2.3 (lower platforms) are in the forms of a circular base platform, a T-shaped base platform, a triangular base platform, and a C-shaped base platform, respectively.

Figure 13:
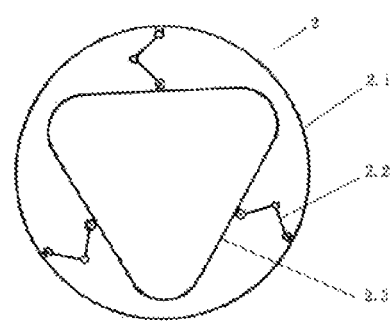
Figure 14:
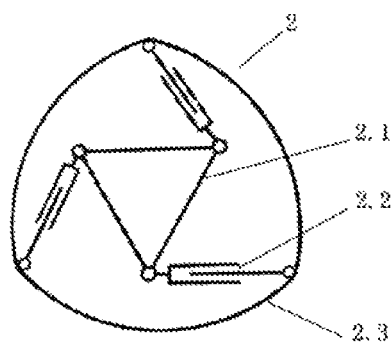

FIGS. 13 and 14 are simplified diagrams of two other thigh mechanisms, both of which are full DOF planar parallel mechanisms to form three DOFs (TxTyRz), and three types of thigh branch chains 2.2 are respectively RRR or RPR branch chains. The thigh base platforms 2.3 are a ring shape and a convex triangle, respectively. The type of the upper platform 2.1 is shown in the figure, and will not be described again.

Figure 15:
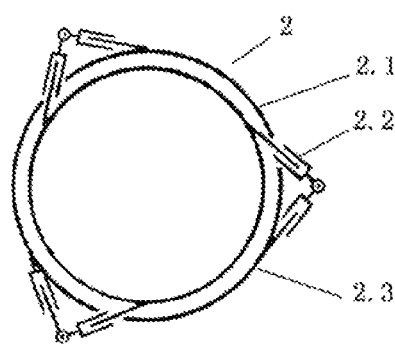

FIG. 15 is a schematic diagram of another thigh mechanism 2, which is also a full DOF planar parallel mechanism. The three thigh branch chains 2.2 are all PRP branch chains. Its upper platform 2.1 and thigh base platform 2.3 (lower platform) are both circular platforms.

Figure 16:
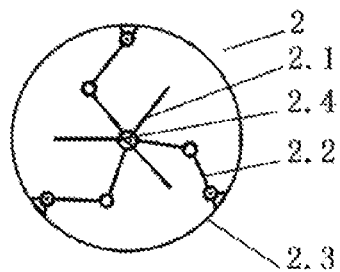

FIG. 16 is a schematic diagram of a thigh mechanism 2 of a hybrid-connection mechanism. The hybrid-connection mechanism is composed of a planar parallel mechanism and a rotational pair 2.4 in series, and has three DOFs (TxTyRz). The three thigh branch chains 2.2 are all RRR branch chains, one of which is a redundant branch chain, forming a two-DOF parallel mechanism. The upper platform 2.1 is Y-type, and the thigh base platform 2.3 (lower platform) is ring-shaped.

Figure 17:
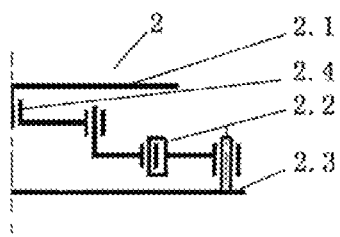
FIG. 17 is a cross-sectional view of a branch chain of the thigh mechanism of FIG. 16.

FIG. 17 is a cross-sectional view of a branch chain of the thigh mechanism of the hybrid-connection mechanism of FIG. 10. A planar two-DOF parallel mechanism with passive branch chains is connected in series with a rotational pair 2.4. The central axis of rotation is perpendicular to the horizontal plane, providing a steering freedom. Other features are the same as in FIG. 16.

Hybrid-connection leg mechanism:

There are many types of hybrid-connection leg mechanisms, for example, standing leg, lifting-standing leg, steering leg, steering-stepping leg, unidirectional stepping leg, bidirectional stepping leg, full-function leg, standing leg with adjustable toe spacing in one direction, standing leg mechanism with adjustable toe spacing in two directions, wheeling legs, rolling legs, etc. The following are some typical configurations of the hybrid-connection leg mechanism.

FIGS. 18-25 show several different hybrid-connection leg mechanisms. The base platform 3.3 is a Y-base platform.

Figure 18:
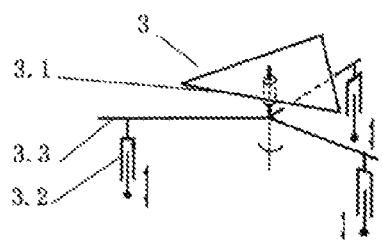
FIGS. 18-20 are schematic perspective diagrams of three types of hybrid-connection leg mechanisms with low DOFs.
Figure 19:
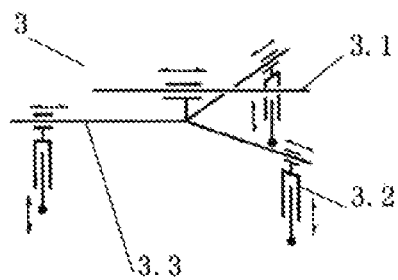
Figure 20:
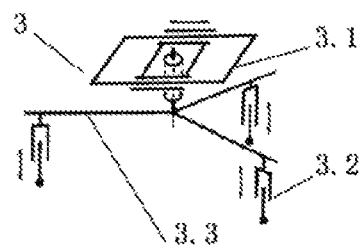

FIGS. 18-20 are three types of low DOF hybrid-connection leg mechanisms. The metatarsal branch chains of the foot parallel mechanism 3.2 are all translational pairs.

FIG. 18 is a schematic diagram of a steering hybrid-connection leg mechanism 3. The thigh mechanism 3.1 is composed of a rotational pair, the axis of the rotational pair is perpendicular to the horizontal plane, the upper platform 3.1 is triangular, and the base platform 3.3 is Y-shaped. The thigh mechanism is a single DOF mechanism. The foot parallel mechanism 3.2 is a lifting-standing leg with a Y-shaped base platform. The steering hybrid-connection leg mechanism has four DOFs and has the functions of steering and standing. This steering leg mechanism can only constitute a walking robot in cooperation with a hybrid-connection leg mechanism that has stepping or more functions.

FIG. 19 is a schematic diagram of a unidirectional stepping hybrid-connection leg mechanism 3. The thigh mechanism 3.1 is composed of a prism pair, the prism axis is horizontal, and the foot parallel mechanism 3.2 is a lifting leg with a Y-shaped base platform 3.3. This unidirectional stepping hybrid-connection leg mechanism has four DOFs, with two functions of stepping and standing. The prism pair can also be substituted by a C pair, with an extra redundant DOF Rx. This unidirectional stepping leg mechanism can only constitute a walking robot in cooperation with a hybrid-connection leg mechanism that includes steering or more functions.

FIG. 20 is a schematic diagram of a unidirectional stepping steering hybrid-connection leg mechanism 3. The thigh branch chain of the thigh mechanism 3.1 is composed of two parallel cylindrical pairs and a rotational pair in series. The axes of the cylinder pairs are horizontal, and a rotational pair is connected in series. The axis of the rotational pair is perpendicular to the horizontal plane. The thigh mechanism has two DOFs (TxRz). The joint leg mechanism has five DOFs and has three functions of stepping, steering and standing. This unidirectional stepping-steering leg mechanism can cooperate with various leg mechanisms to form a walking robot.

Figure 21:
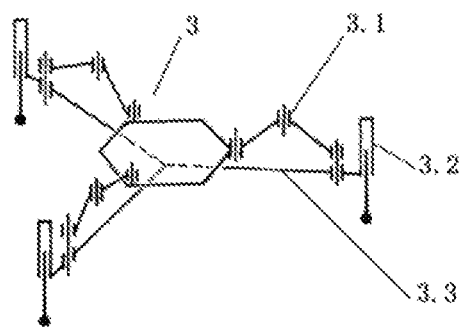
FIG. 21 is a schematic perspective view of a hybrid-connection leg mechanism with full DOFs.

FIG. 21 is a full DOF hybrid-connection leg mechanism 3. Their thigh mechanism 3.1 is a full DOF planar parallel mechanism, the thigh branch chain is an RRR branch chain, and the foot parallel mechanism 3.2 is a metatarsal branch chain which is a lifting-standing leg of a translational pair. Base platform 3.3 is a Y-base platform. The height of the body in FIG. 21 is determined such that when the movable pair is retracted, the robot body's abdomen (the bottom base platform) can contact the ground. The robot can crawl. This leg mechanism can cooperate with any leg mechanism to constitute a walking robot. Any kind of full DOF leg mechanism can cooperate with any leg mechanism to constitute a walking robot.

Figure 22:
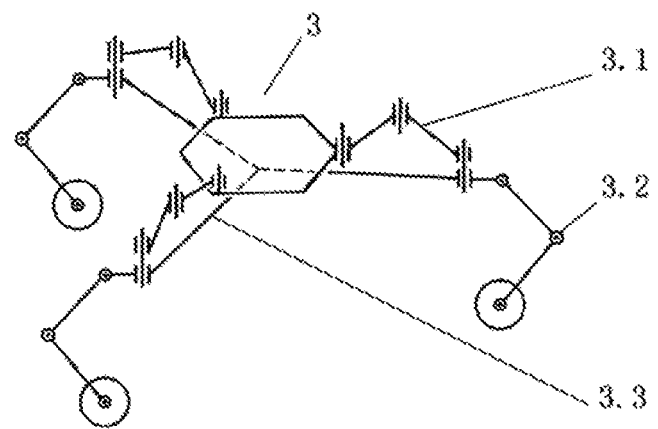
FIGS. 22 and 23 are schematic perspective views of two types of hybrid-connection leg mechanisms with adjustable wheel toe spacing.

FIG. 22 is a perspective view of a hybrid-connection leg mechanism 3. The thigh mechanism 3.1 is the same as the thigh mechanism of FIG. 21. The base platform 3.3 is a Y-shaped platform. The metatarsal branch chain of the foot parallel mechanism 3.2 has two DOFs. The branch chain is an RR branch chain. The two rotation pair axes are parallel to each other. The toe spacing can be adjusted. At least one of the wheels is a steering wheel. The metatarsal branch chains can be turned over the pelvic plane. When the body is turned by 180 degrees, it can still walk or run on wheels.

Figure 23:
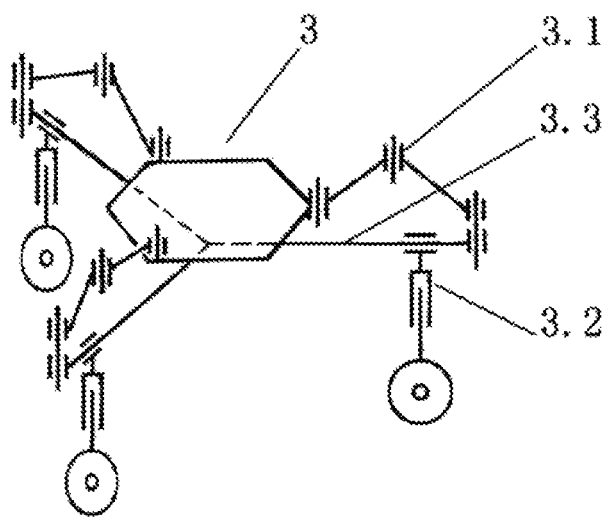

FIG. 23 is a perspective view of another hybrid-connection leg mechanism 3 slightly different from FIG. 22. The thigh mechanism 3.1 is connected to the foot parallel mechanism 3.2 through the base platform 3.3. The difference from FIG. 22 is that the two DOFs of the metatarsal branch chain are completed by the PP branch chain, the two moving pair axes are perpendicular to each other, the toe spacing can be adjusted, and the output end of the metatarsal branch chain has wheels. The metatarsal branch chains cannot be turned over the pelvic plane. Reference numerals are the same as in FIG. 22.

Figure 24:
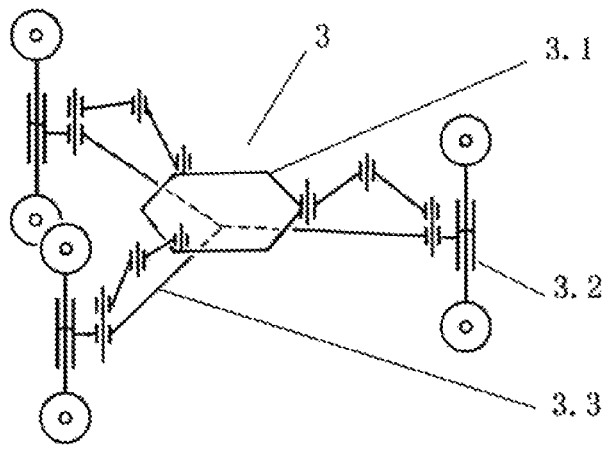
FIGS. 24 and 25 are three-dimensional schematic diagrams of two types of hybrid-connection leg mechanisms with wheels that can walk on both sides.
Figure 25:
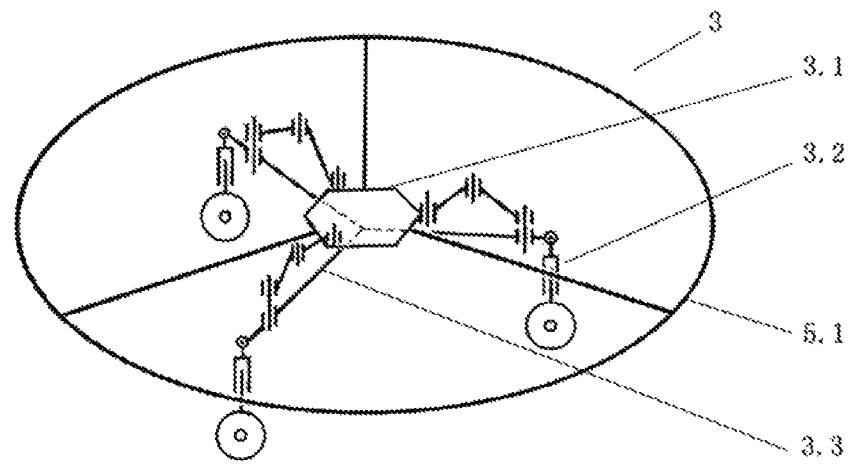

FIG. 24 is a double-sided walking hybrid-connection leg mechanism 3. The thigh mechanism 3.1 is connected to the foot parallel mechanism 3.2 through the base platform 3.3. The basic mechanism is the same as that of FIG. 21. The main difference is that the single-output kinetic pair in FIG. 21 is replaced with the dual-output kinetic pair in FIG. 24. It can be seen that when the body is turned by 180 degrees, it can still walk. The difference between this configuration and FIG. 25 is that it does not require conversion in double-sided walking. The combination of two such leg mechanisms can constitute a double-sided walking robot. If a big ring is installed in the pelvic plane, it can fall down and resume walking when it stands on its side to achieve double-sided walking, or keep the robot on its side to move by rolling.

FIG. 25 is a leg mechanism with a big ring. The leg mechanism 3 has six DOFs, and has a bidirectional stepping function and steering-standing functions. The thigh mechanism 3.1 is a planar parallel mechanism with three DOFs. The thigh branch chain is an RRR branch chain. The foot parallel mechanism 3.2 is a 3-DOF semi-closed-loop parallel mechanism. The metatarsal branch chain is an RP branch chain and the toes are wheeled rotational pairs. The foot parallel mechanism is a lifting leg with Y-shaped base 3.3. In addition to three functions of bidirectional walking, steering and standing, it can also run on wheels instead of walking. As to its working condition, this hybrid-connection walking robot is symmetrical about the pelvic plane. The big ring 5.1 is in the same plane with the pelvis. The diameter of the big ring is larger than the diameter of the circumcircle of the toe triangle, which can ensure that the robot body can fall down when standing on one side, and then resume walking.

The combination of two such leg mechanisms can constitute a double-sided walking robot with three movement modes of walking, running on wheels and rolling. It is sufficient to have a big ring on one leg mechanism instead of two big rings. If the robot with a big ring cannot fall down or walk when standing on one side, it can achieve rolling movement by changing the position of the center of gravity.

Ten representative embodiments of the present invention are described below.

FIGS. 26-33 are simplified diagrams of many different hybrid-connection walking robots. In the embodiments described below, the thigh branch chains of most thigh mechanisms use RRR branch chains. This is just for convenience. In practice, it is completely feasible to replace the branch chain of the thigh mechanism in the embodiments with another branch chain. For example, it is feasible to change to RPR branch chain and PRP branch chain. For a thigh mechanism, it is also feasible to use different types of branch chains.

In the following embodiments, one or two DOF branch chains are applied to the metatarsal branch chains of most foot parallel mechanisms. This is just for convenience. In practice, it is completely feasible to replace the branch chains of the metatarsal mechanism with other branch chains with multiple DOFs or more kinetic pairs, including those with redundant DOFs. For example, it is feasible to use the RRR branch chain and the RPP branch chain. For a metatarsal branch chain, it is also feasible to use different types of metatarsal branch chains. For example, a five-DOF foot parallel mechanism can meet the requirements of lifting and standing, and also change the spacing of the toes.

In each of the embodiments described below, for two leg mechanisms connected together, their two thigh branch chains, two base platforms, and two sets of metatarsal branch chains each have separate working spaces that without any interference with each other. The working spaces of two adjacent toes are also allowed to be partially overlapped, and can be prevented from interfering with each other in a controlled manner.

Embodiment 1 (FIG. 26) comprises a hybrid-connection walking robot 4 composed of two hybrid-connection leg mechanisms (FIG. 21). The upper platforms of leg mechanism A 4.1 and leg mechanism B 4.2 (the hip bone planes are offset by 60 degrees from each other) are connected together, forming a pelvis 4.3. The branch chains of the two thigh mechanisms are on the same level (or on different levels). The thigh branch chains of the two leg mechanisms each occupy a fan-shaped space of about 60 degrees and without any interference with each other. The two Y-shaped base platforms are at different heights and without any interference with each other. Each metatarsal branch chain occupies a fan-shaped space of about 60 degrees, and does not interfere with each other. The toes on its two leg mechanisms each occupy approximately 60 degrees of fan-shaped space. Each toe has independent free work space. This is an internal-external type hybrid-connection walking robot. The distance between the centers of gravity of the two toe triangles is substantially equal to zero. The projections of the two toe triangles on the horizontal plane are mostly overlapping, and the centers of the two upper platforms are substantially coincident. This is an isotropic hybrid-connection walking robot.

If the robot's metatarsal branch chains are moved by the RHP branch chains, the robot's drive motor can be installed on the pelvis. To drive the metatarsal branch chains, a motor can be installed on the pelvis, and the metatarsal branch chains can be driven indirectly by two toothed belts through axes of two parallel rotational pairs of on each thigh branch chain.

Figure 28:
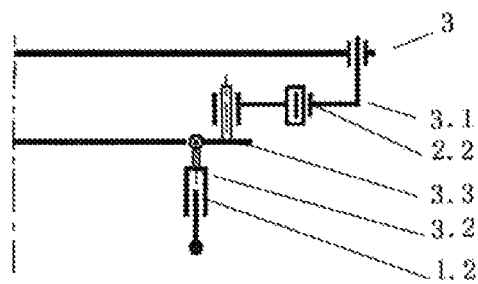
FIGS. 28 and 29 are cross-sectional views of branch chains of the two leg mechanisms of FIG. 27.
Figure 29:
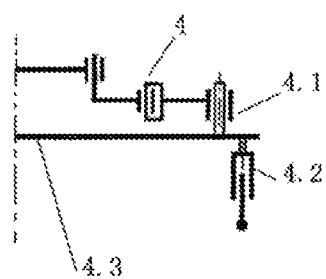
Figure 30:
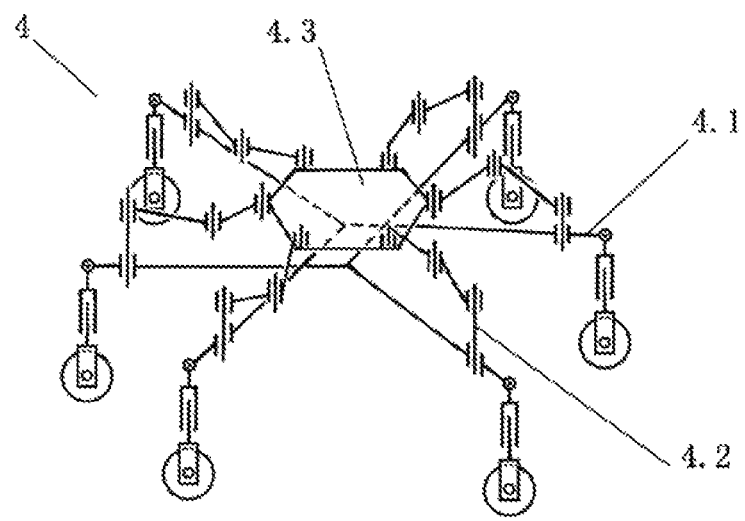
FIG. 30 is a schematic perspective view of a wheeled full DOF double-sided hybrid-connection walking robot.
Figure 31:
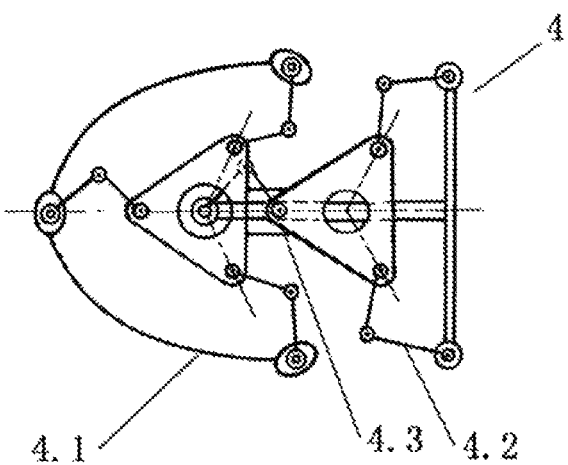
FIGS. 31 and 32 are three-dimensional schematic diagrams of two cross-type full DOF hybrid-connection walking robots.

Embodiment 2 (FIG. 27) comprises a hybrid-connection walking robot 4 composed of two hybrid-connection leg mechanisms (a larger one and a smaller one). The larger hybrid-connection leg mechanism 4.1 can be understood with reference to FIG. 13, and the smaller leg mechanism 4.2 can be understood with reference to FIG. 11. The upper platforms of the two leg mechanisms are connected together to form a pelvis 4.3. The branch chains of the two thigh mechanisms are on the same level, and the pelvis is on the other level (or on the same level). The thigh branch chains 2.2 have their own movement space and do not interfere with each other. The two base platforms are at the same height, one is a convex triangle (a larger one), and the other is a Y-shape (a smaller one), without any interference with each other. Each metatarsal branch chain 1.2 has its own movement space. If the toe triangle of the larger leg mechanism is larger, the toe working space can be larger. The distance between the centers of gravity of the two toe triangles is 0, and the base platform structure is also suitable for a double-sided robot. FIG. 28 is a cross-sectional view of a branch chain of the larger leg mechanism (including thigh branch chain and metatarsal branch chain); FIG. 29 is a cross-section of a branch of the smaller leg mechanism (including thigh branch chain and metatarsal branch chain). Reference numerals are the same as in FIG. 27.

Embodiment 3 (FIG. 30) comprises a double-sided walking and wheeling hybrid-connection walking robot 4. The hybrid-connection leg mechanism is the same as the leg mechanism of FIG. 25 (no big ring). The leg mechanism A 4.1 and the leg mechanism B 4.2 both have six DOFs, with bidirectional stepping function and steering and standing functions. The thigh mechanism is a planar parallel mechanism with three DOFs, the thigh branch chain is an RRR branch chain, and the foot parallel mechanism is a 3-DOF semi-closed-loop parallel mechanism. The metatarsal branch chain is an RPRw branch chain. The foot parallel mechanism is a unidirectional adjustable standing toe leg of the Y-shaped base platform.

The planes of the upper platforms (hip bones) of the two leg mechanisms are offset by 60 degrees from each other and connected to form a pelvis 4.3. The distance between the centers of gravity of the two toe triangles is zero. The branch chains of the two thigh mechanisms are on the same level (or on different levels). The branch chains of the two leg mechanisms each occupy a fan-shaped space of about 60 degrees and without any interference with each other. The two Y-shaped base platforms are at different heights and without any interference with each other. Each metatarsal branch chain occupies a fan-shaped space of about 60 degrees, and does not interfere with each other. There are wheels at the ends of the metatarsal branch chain, and the metatarsal branch chain can be turned over the pelvis to form a double-sided walking robot.

If a big ring is installed in the pelvic plane (refer to FIG. 25), it can become a robot that can roll when standing on one side. In order to reduce the lateral size during normal walking, the big ring can be designed as an expandable and shrinkable big ring, and the big ring is not limited to the expandable mechanism given in Document 2. In this way, this robot has three movement modes: walking, wheeling and rolling. This is a wheel-legged walking robot.

Figure 33:
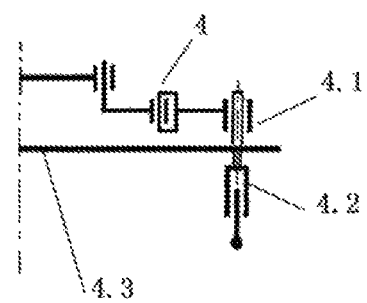
FIG. 33 is a cross-sectional view of a leg mechanism of the two full DOF hybrid-connection walking robots of FIGS. 31 and 32.
Figure 34:
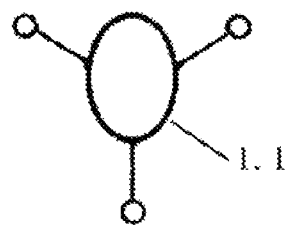
FIGS. 34 and 35 show two variants of foot arch type base platform 1.1.
Figure 35:
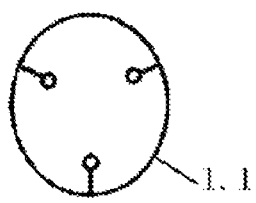

Embodiment 4 (FIG. 31) comprises a hybrid-connection walking robot 4 composed of two hybrid-connection leg mechanisms (left and right). The upper platforms of the two leg mechanisms are connected together, on left and right sides respectively, to form a pelvis 4.3; branch chains of two thighs are on the same level, the pelvis 4.3 is on a different level; the base platform of the left leg mechanism 4.1 is a C-type base platform, and the base platform of the right leg mechanism 4.2 is a T-type base platform; the two base platforms are at the same height and without any interference with each other. The two toe triangles are in phase, and one toe of the right foot parallel mechanism is located at the center of the toe triangle of the left leg mechanism. The distance between the centers of gravity of the two toe triangles is 0.5 (Ra+Rb). This is a hybrid-connection walking robot with only one axis of symmetry. This is a non-isotropic hybrid-connection walking robot. The movement speed in the forward direction will be faster, and the side movement will be slower. FIG. 33 is a sectional view of a branch chain including a thigh branch chain and a metatarsal branch chain.

Embodiment 5 (FIG. 32) comprises another hybrid-connection walking robot 4 consisting of two parallel leg mechanisms (left and right). The upper platforms of the two leg mechanisms are connected together, and the two upper platforms form a rectangular pelvis. 4.3. The branch chains of the two thigh mechanisms are on the same level. Each thigh branch chain has its own independent movement space. The pelvis is on a different level (it can also be on the same level). The base platform is a curved convex-triangular base platform. The base platform of the right leg mechanism 4.2 is also a curved convex-triangular base platform. The two base platforms are at different heights and without any interference with each other. One toe of the right foot parallel mechanism is located at the center of the toe triangle of the left leg mechanism. One toe of the left foot parallel mechanism is located at the center of the toe triangle of the right leg mechanism. The distance between the centers of gravity of the two toe triangles is 0.5 (Ra+Rb). This is a hybrid-connection walking robot with two axes of symmetry and a non-isotropic hybrid-connection walking robot. The movement speed in the forward direction will be faster, and the side movement will be slower. FIG. 33 is a sectional view of a branch chain including a thigh branch chain and a metatarsal branch chain.

Embodiment 6 comprises a low DOF hybrid-connection walking robot (eight DOF) composed of a combination of FIG. 18 and FIG. 19. FIG. 18 is a steering leg, and FIG. 19 is a unidirectional stepping leg mechanism. During assembly, the metatarsal branch chains of the two leg mechanisms each occupy a 60-degree fan-shaped space. One leg mechanism completes the functions of steering, lifting and standing, and one leg mechanism completes the stepping function. This robot can only perform intermittent straight and intermittent steering (continuous steering at small angles).

Embodiment 7 comprises an eight-DOF walking robot composed of FIG. 20 and FIG. 1 in combination. This is a hybrid-connection walking robot composed of a hybrid-connection leg mechanism and a foot parallel mechanism. FIG. 1 is a lifting-standing leg, and FIG. 20 is a unidirectional stepping steering leg mechanism. During assembly, the metatarsal branch chains of the two leg mechanisms each occupy a 60-degree fan-shaped space. One leg mechanism completes the functions of lifting and standing, and the other leg mechanism completes the functions of steering and stepping. This robot can only perform intermittent straight and intermittent steering (continuous steering at small angles).

The configurations of the hybrid-connection walking robot with various structural forms are given above. In order to increase the stable interval of steady-state walking and to adjust the toe spacing conveniently, a two-row toe hybrid-connection robot solution is designed below. In order to achieve crawling and double-sided walking or crawling, several hybrid-connection walking robot solutions with crawling and walking functions are given below. A new method for roller skating is also given. The following embodiment 8 is a double-row toe hybrid-connection walking robot. Embodiment 9 is a single-sided crawlable hybrid-connection walking robot. Embodiment 10 is a double-sided hybrid-connection walking robot that can crawl and roll. This is a double-sided hybrid-connection walking robot with an elastic structure in the outer ring or a closed structure.

In the above mentioned various configurations, when the hybrid-connection leg mechanism is constructed, the platform connected to the metatarsal branch chain in the thigh mechanism is also called a base platform, and the other platform of the thigh mechanism is also called a hip joint platform (hip bone). When constructing the hybrid-connection leg mechanism, the order of the upper and lower platforms of the thigh mechanism can be arbitrarily configured. When the hip joint platform is at the bottom, it is still called an upper platform, or to avoid confusion, it is collectively called a hip joint platform. The upper and lower order of the thigh mechanism, the upper and lower order of the thigh branch chain, and the upper and lower order of the base platform can be configured at will.

Embodiment 8

It comprises a hybrid-connection walking robot comprising two rows of toes. Six toes of two parallel hybrid-connection leg mechanisms are located on two parallel straight lines, on each straight line there being three toes. This refers to the state when the robot is in the neutral position, or the state where it is slightly deviated from the neutral position. In actual work, the three toes are not always on a straight line.

Figure 26:
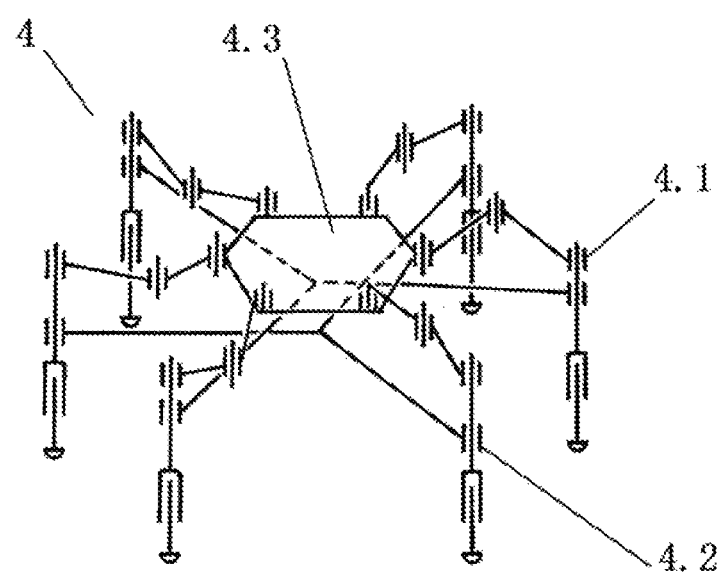
FIG. 26 is a schematic perspective view of full DOF internal-external hybrid-connection walking robot.
Figure 27:
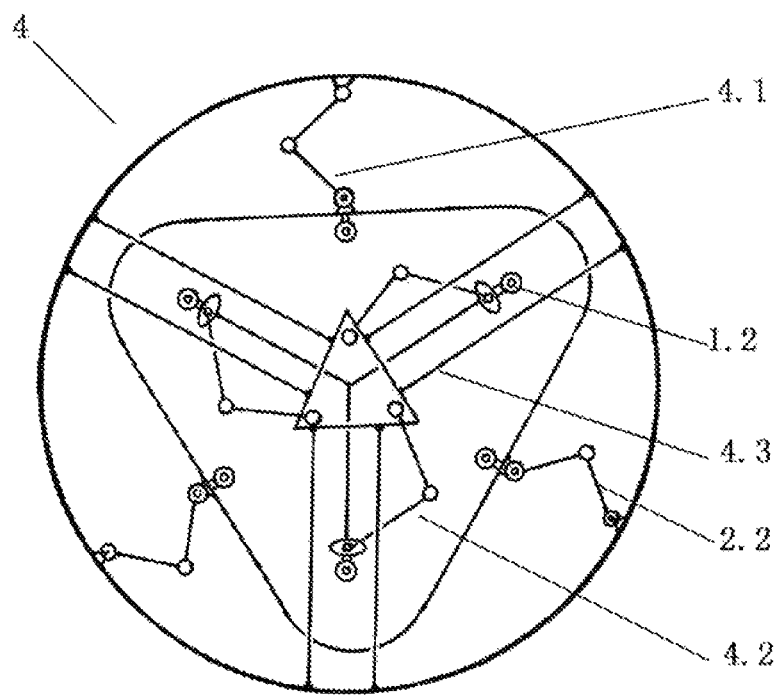
FIG. 27 is a top view of another full DOF internal-external hybrid-connection walking robot.
Figure 32:
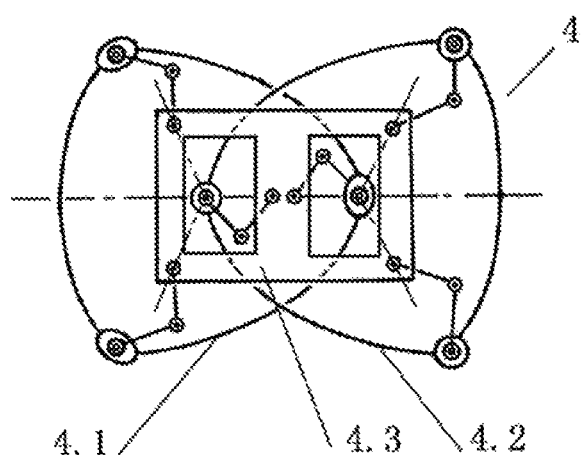

The toes of the two embodiments of FIGS. 26 and 32 are not two rows of toes. In order to arrange the toes on two parallel straight lines, it is necessary to change the shape of the base platform, or adjust the related installation method, or change the shape of the base platform and the relative installation position of the thigh branch chain at the same time.

Changes may be made to the shape of the base platforms. For example, the three branch chains of the Y-shaped base are different in length, the three branch chains of the Y-shaped base are not all straight (see the figures), and the center of the Y-shaped base is a ring (see FIG. 34). For another example, variants of a hollow base platform may include the case that: an ellipse connects three inward arms (see FIG. 35), and ankle joints are installed at the ends of the arms. The metatarsal branch chain is mounted on the outside or inside of the joint of the platform under the main leg. The shape of the varied base platform can be a variety of shapes.

Another method is to change the installation position of the metatarsal branch chain, thereby changing the position of the toes. For example, when the mobile accessory is used as the metatarsal branch chain, the metatarsal branch chain is installed outside the knee joint.

A third method is to not change the installation position of the metatarsal branch chain, and only change the position of the toe. For example, by using the RR metatarsal branch chain, the toe is outside the ankle joint. By deflection of the metatarsal branch chain, the position of the toes is changed. When the RR branch chain is selected for the metatarsal branch chain, the respective working spaces can be determined like the series leg mechanism of a common bionic walking robot. You can also choose this way: the working space of the first rotational pair chooses about 60 degrees above and below the horizontal plane; the working space of the second rotational pair chooses about 50 degrees on both sides of the vertical line. This kind of metatarsal branch chain is also feasible for double-sided robots. Of course, it is also a feasible method to change the installation position of the metatarsal branch chain and the position of the toes.

Another method is to adjust the relative position of the two base triangles so that the two toes are aligned on two parallel straight lines.

These methods or a combination of methods can achieve the purpose of collinear three toes.

In order to better adapt to the terrain of the landing point, the toe end moves the ball pair or universal joint in series. This series ball joint or universal joint structure is suitable for all hybrid-connection walking robots.

For two-row (three-row) type toe layout, the better configuration is shown in FIGS. 36, 37, 38, 39.

In FIGS. 34-39, the smaller circle indicates the toe position or the installation position of the base branch chain (ankle joint position); the larger circle indicates the knee position or the installation position of the thigh branch chain. The larger oval represents the knee joint of one leg, and the smaller oval represents the toe or metatarsal mounting point; it is used for a double-row toe hybrid-connection walking robot.

Figure 36:
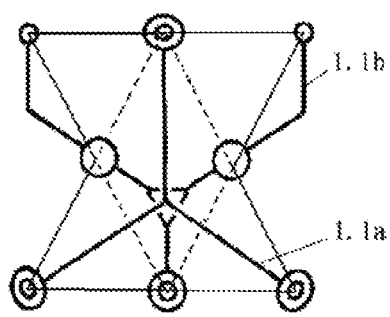
FIGS. 36-39 show four combinations of foot arch type base platforms.

FIG. 36 is the base platform combination of the hybrid-connection walking robot with a completely inclusive structure. The connection point between the thigh branch chain and the base platform is called a knee joint. Three or more knee joints usually form a triangle or a polygon, and are commonly referred to as the knee triangle. The connection point between the thigh branch chain and another platform is called hip joint. Three or more hip joints usually form a triangle or polygon. They are commonly referred to as hip joint triangles. Two hip joints connected together are called pelvis. The connection point between the metatarsal branch chain and the base platform is called an ankle joint, and the three ankle joints form an ankle triangle. Three toes form a toe triangle. If the metatarsal branch chain is an RR branch chain, the second turning pair is called a metatarsal joint. The three metatarsal joints form a triangle, called a metatarsal joint triangle. Three toes form a toe triangle, and this triangle is a stable triangle for this leg. The common area of the two triangles of the two legs is the common stable area of the hybrid-connection walking robot.

The fully-contained hybrid-connection walking robot has two leg mechanisms (a large one and a smaller one), one is an outer leg, and its knee joint has a larger triangle, corresponding to the Y-shaped base platform 1.1a. The three metatarsal branch chains of the outer leg are installed near the ankle (knee) joint. The knee joint triangle (if it is a polygon, simplified as a triangle) basically coincides with the toe triangle. One is the inner leg, which has a smaller knee triangle. The corresponding base platform is a varied Y-shaped base platform 1.1b. The two branch chains of the Y-shaped base are lengthened, and the metatarsal branch chain is installed at the extended end point. The toe triangle (three smaller circles in the figure) becomes larger. The upper three toes in FIG. 36 are on a straight line, the other three toes are on another straight line, and the two straight lines are parallel.

Figure 37:
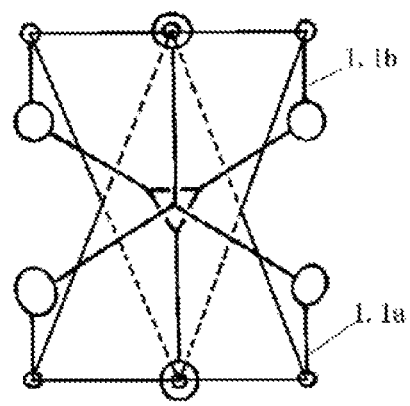

FIG. 37 is a base platform configuration of mutually inclusive structure. The two knee joint triangles are equal in size, and the centers of the two triangles are on a vertical line. The Y-shaped bases corresponding to the triangles of the two knee joints were appropriately varied to form varied base platforms 1.1a and 1.1b. The left and right base branch chains of each leg are extended upward or downward. Install cheekbones at the extended ends. The three toes in the figure are on a straight line, the other three toes in the figure are on another straight line, and the two straight lines are parallel. A hybrid-connection walking robot having two rows of toes is thus formed.

Figure 38:
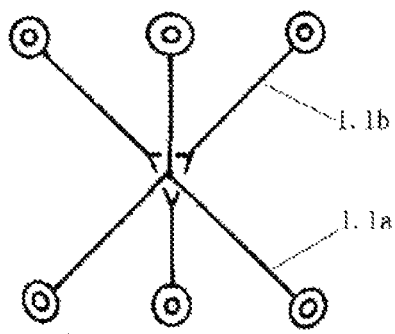

FIG. 38 shows another hybrid-connection walking robot with mutually inclusive structure. The two knee joint triangles are equal in size, the toes are below the knee joint, and the centers of the two triangles are not on a perpendicular. There is a distance between the two centers, just so that the two toes are on two parallel straight lines. In the picture, the base platform of the leg A is represented by 1.1a, and the base platform of the leg B is represented by 1.1b.

Figure 39:
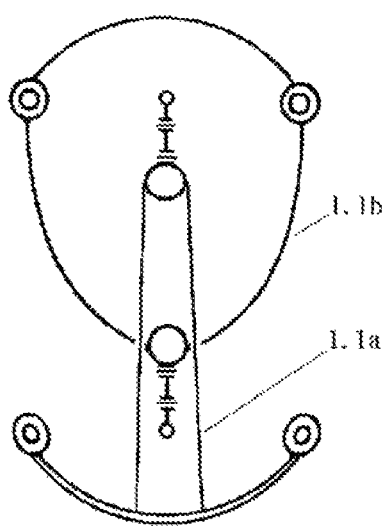

FIG. 39 is a base platform configuration of a partially-contained structure with two knee joints in opposite phases. The center of a knee joint triangle is one toe of the other leg. Metatarsal branch chains RR are installed at the base platform ends. With the RR branch chain, the toes are below the knee joints, anteriorly or posteriorly. The three toes in FIG. 38 are on a straight line, the other three toes are on another straight line, and the two straight lines are parallel. This base platform configuration is applied to the embodiment of FIG. 32, instead of the base platform of FIG. 32, forming a two-row toe hybrid-connection walking robot. See FIG. 43 for tilted metatarsal branch chain. In FIG. 39, the base platform of the leg A is represented by 1.1a and the base platform of the leg B is represented by 1.1b.

Advantages of two rows of toes:

Two rows of toes are good for walking on some special roads. For example, going up and down stairs. With two rows of toes, the distance between the two rows of toes can be easily adjusted to suit the width of the step. The distance between the toes is an integer multiple of the width of the step. Another advantage of two rows of toes is the large overlap between the two toe triangles and the wide stability range. Especially in the forward direction, the stability intervals of the two triangles are 100% overlapping (the diamond formed by the dotted lines in FIG. 36 and FIG. 37 is the common stable area). The area of public stability is not isotropic. There is a wide range of public stability in one direction. This creates favorable conditions for high-speed walking under steady-state conditions. The two-row toe configuration has only two rows of footprints when walking side-standing. The single-sided and double-sided crawling walking robot configuration described below can also be designed as a two-row toe configuration.

The knee joint triangle is different from the toe triangle. In this way, a smaller knee joint triangle can be configured with a larger toe triangle to obtain greater stability.

Embodiment 9—Single-Sided Crawling Walking Robot

In the hybrid-connection walking robot, at least one hip joint plane of the two hip joint platforms of the thigh mechanism is located at the bottom. The other hip joint platform is located at the middle or highest, or shares a frame plane with the lowest hip joint. The hip joint platform forms the abdomen of the robot. When the three metatarsal branch chains are contracted, the three toes and the abdomen are in a plane or higher than the abdominal plane. The abdomen can be close to the ground. Construct a single-sided walking robot. The robot can move in a crawling manner.

Referring to FIG. 26, the two thighs in FIG. 26 are turned by 180 degrees, and the metatarsal branch chains are not changed, and a hip joint platform with a thigh mechanism at the bottom of the body is obtained.

Embodiment 10

This double-sided crawling (walking) hybrid-connection walking robot has one hip joint platform at the bottom and the other hip joint platform at the top. The two hip joint platform frames are connected together at the periphery or center. The two hip joint platform frames are disc-shaped, the upper disc is convex, the lower disc is concave, and the two discs are buckled together to form a discus-type pelvis. There are holes (3-6) around the discus, with metatarsal branch chains in the holes. When there are six holes, there is a metatarsal branch chain in one hole. The thigh mechanism and equipment are mounted between two hip joint planes. Both leg mechanisms are equipped with a double-acting metatarsal branch chain. The double-acting metatarsal branch chain is driven by a common (sleeve), which is driven by the transmission device or driven by the clutch. Construct a double-sided walking (or crawling) hybrid-connection walking robot.

Double acting metatarsal branch chain: there are two main categories. One type is the single metatarsal branch chain type, and the other type is the double metatarsal branch chain type.

Single metatarsal branch chain:

Single-DOF metatarsal branch: The single-DOF metatarsal branch has two outputs, and the two outputs can work on two sides. Such as R branch chain, P branch chain. The R and P branch chains have a larger working space and can work on two sides. Rotate the working space of the auxiliary R branch chain to select about 90 degrees above and below the horizontal plane; it is suitable for normal work and work after steering. See the metatarsal branch chain on the right in FIG. 40.

Two-DOF metatarsal branch chain: such as RP branch chain, RC branch chain, RR branch chain. P pair and C pair are a kinetic pair, but there are two outputs, one on the top and one on the bottom (see 3.2 in FIG. 24). Achieve two side jobs. For another example, for the RR branch chain, the working space of the first rotational pair selects about 60 degrees above and below the horizontal plane; the working space of the second rotational pair selects about 45 degrees on both sides of the vertical line. When the working state is changed, the second rotational pair must rotate a larger angle to move the toes to the other side.

A double-acting metatarsal branch chain with a metatarsal branch chain has other structural solutions. The metatarsal inscription chain formed by a curved rod (refer to FIG. 42). It is convex during normal operation. At this point, the toes are below. If you move your toes to the other side, you need to change the convex-concave characteristics of the crank: turn it 180 degrees around the axis at the end of the crank. Turn your toes to the other side. This requires a driving power.

Double metatarsal branch chain type:

There are two cheekbones, the lower one is responsible for normal work, and the upper one is responsible for walking after flipping 180 degrees. The two metatarsal branch chains are driven by a single drive or individually or by clutch switching.

Figure 42:
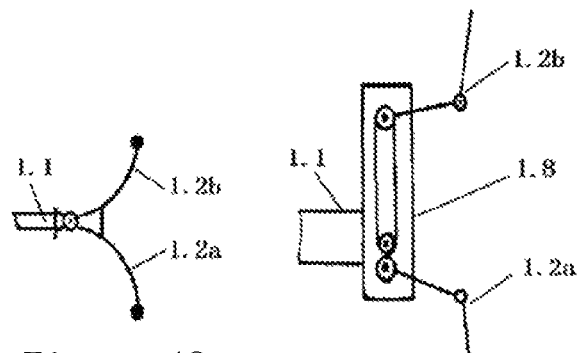
FIG. 42 is a diagram of a single-DOF double-action metatarsal branch chain.
Figure 43:
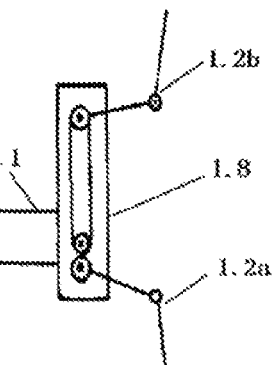
FIG. 43 is a diagram of a two-DOF double-action metatarsal branch chain.

FIG. 42 is a double branched metatarsal branch chain. One rotational pair, two crank lever output ends, one on top (1.2*b*) and one (1.2*a*) on the bottom. One drive drives the two curved levers to rotate. Both crank levers rotate in the same direction. FIG. 43 is a second type of double acting metatarsal branch chain. The metatarsal branch chains (1.2*a*, 1.2*b*) are RR branch chains. Two outputs, one on top and one on bottom. There is one transmission box, and one drive. The transmission box 1.8 is installed on the base platform 1.1. There is a clutch or transmission device in the transmission box 1.8. Different states drive different curved levers. Two curved levers can be retracted into the discus. The distance between the two output ends of the metatarsal branch chain is large, which is suitable for thickened robot bodies. Another feature of this metatarsal branch chain is that the toes are not directly below the ankle joint. Hybrid-connection robots for two rows of toes are also feasible.

There is also a multi-DOFs double-acting metatarsal branch chain, which is similar in structure to the above mentioned metatarsal branch chain and will not be described again.

In the double-sided hybrid-connection walking robot described above, the periphery of the discus-type pelvis is made of an elastic material. When falling from a high altitude, the body is elastically deformed, reducing the impact force and protecting the equipment inside the body. The centers of the upper and lower hip joint platforms are connected with an elastic buffer material. Have better impact resistance. Various sensors are installed outside the discus.

In the double-sided hybrid-connection walking robot described above, the metatarsal branch chain is connected to the edge of the hole with a material (including fireproof, waterproof, bulletproof and anticorrosive materials) or a structure with expandable performance to form a closed structure. Such as expandable and shrinkable fabrics, organ covers, etc. The closed structure has the functions of dustproof, waterproof, radiation-proof, bullet-proof and anti-corrosion.

Figure 40:
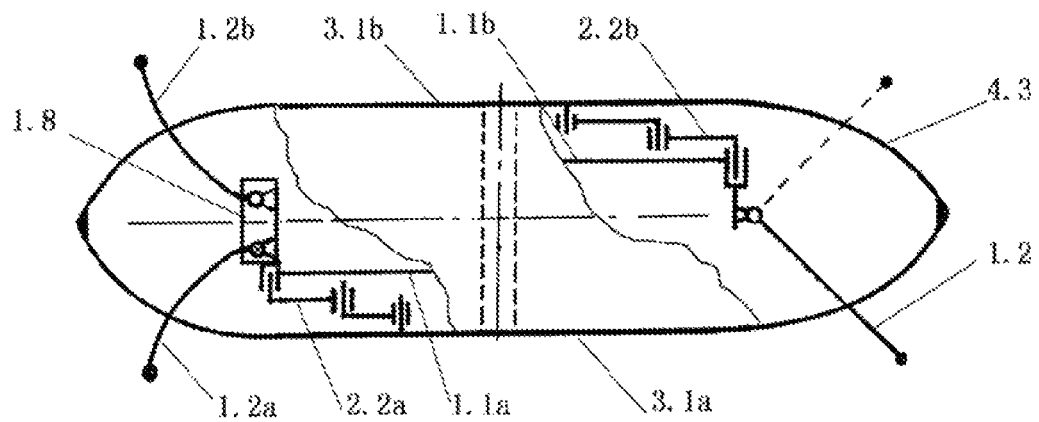
FIG. 40 is a front view of Embodiment 10 (a double-sided crawling walking hybrid-connection robot).
Figure 41:
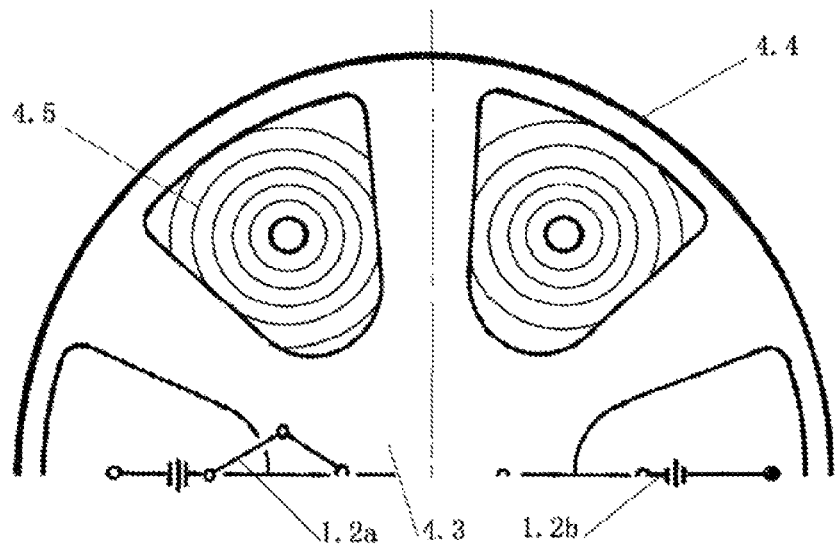
FIG. 41 is a plan view of Embodiment 10.

FIG. 40 and FIG. 41 are front and top views of the double-sided circular walking robot. In the figure, the thigh branch chains (2.2*a*, 2.2*b*) are the RRR branch chains, the discus-shaped pelvis 4.3, and the double-acting metatarsal branch chains (1.2*a*, 1.2*b*). On the left is a double-branched double-acting single-DOF metatarsal branch chain, two metatarsal branch chains are connected and driven by a transmission box 1.8. On the right is the single-chain double-acting single-DOF metatarsal branch chain 1.2. The hip joints 3.1*a* and 3.1*b* constitute the discus-shaped pelvis 4.3, and numeral 4.4 represents the outer ring. The outer ring and the rod between the two holes are made of elastic material. Numeral 4.5 represents a closing device.

The working methods of the double-sided hybrid-connection walking robot include walking, crawling, and rolling.

When the robot body is relatively flat, such as a discus-type casing, the robot has the characteristics of a tumbler. In this way, both the normal movement of the robot and the movement of the robot when it is turned by 180 degrees can move normally on foot (described earlier).

Now the crawling and rolling operation will be described.

Crawling: The workspace where the metatarsal branch chains are properly arranged can allow the robot to crawl. For example, when the metatarsal branch chain is retracted to the shortest, the outer surface of the pelvis is on the ground. At this time, the outer surface of the pelvis is the robot's abdomen. The robot landed on the abdomen when stopped. This structure lays out the middle part of the two leg mechanisms as the installation space for various equipment. Such as batteries, electric motors, control equipment engines, etc.

Rolling: In a special case, the robot stands on its side (can't fall down), which is equivalent to an upright ring with an intersection with the ground. At this time, by driving the leg mechanism, the position of the center of gravity of the robot is changed to make the ring roll. On the one hand, the body can be moved; on the other hand, it is possible to get rid of the standing phase and restore walking ability.

Advantages of the double-sided hybrid-connection walking robot will be described now.

1) It has the ability to move in almost any state. Both sides can walk or crawl, and can roll or convert to walking when standing.

2) Crawling does not need to carry the full weight load of the robot, and the height of the body is reduced, and the concealment is better. Landing on the abdomen, in addition to reducing energy consumption, also has the advantage that the battery is installed below the abdomen, which can reduce the center of gravity.

3) Convenient to make a closed structure. The pelvis is used as the abdomen to make a closed structure. Suitable for use in battlefield environments. If the surface is properly armored and equipped with various sensors and information transmission equipment, it can be used for battlefield reconnaissance and other tasks.

The upper and lower symmetrical hybrid-connection walking robot also has a structural form: two hybrid-connection leg mechanisms share a hip joint platform to form a pelvis. There is one leg mechanism above the hip joint platform and one leg mechanism below. This is an up and down parallel walking robot. It can also constitute a double-sided hybrid-connection walking robot.

The following describes the roller skating movement method of the wheel-legged hybrid-connection walking robot.

In order to increase the speed of the robot on the structural pavement, in addition to the method of running on wheel movement, the structure and method of roller skating have also been designed.

The roller skating structure is basically the same as the running-on-wheel configuration.

Roller skating method and working process:

After the hybrid-connection walking robot adopts the wheel and leg hybrid-connection method, it adopts the ordinary roller skating method to realize the roller skating motion. However, the track of ordinary roller skating is an S-shaped curve, which is inefficient. Since the wheel configuration has brakes, there is also a simple and efficient new method of roller skating.

1) A preparation state: one leg is in a standing phase, the wheels of which are free to rotate so that this leg is a sliding leg, and the other leg is in a movable phase to form a driving leg; the movable phase means that the toes are lifted slightly, or the branch chains of the leg is passive pairs bearing no load.

(2) A movement process:

2.1) a first action of stepping on the ground applying a force on the ground: at least one of the three wheels of the movable driving leg is completely braked; one or more wheels of the driving leg that are braked reach the ground quickly and kick the ground quickly to drive the standing leg to move; and then the driving leg is raised and moved forwards; the wheels of the sliding leg act as steering wheels by means of which the moving direction of the robot can be changed.

The driving method of driving legs is single toe driving, double toes driving, or three toes driving at the same time. During the movement, the waist (pelvis) can be driven appropriately by the standing leg within a stable range (six DOFs).

2.2) A second action of stepping on the ground applying a force on the ground in any one of the procedures 1 and 2.

Procedure 1: at least one of the three wheels of the movable driving leg is completely braked; one or more wheels of the driving leg that are unidirectionally braked or completely braked reach the ground quickly again and kick the ground quickly to drive the sliding leg to move further; and then the movable leg is raised without braking, or the movable leg is not raised but the braking is removed (at least the braking to the forward moving direction is removed so that, although not raised, the movable leg is allowed to move in the same direction as the standing leg). Then the movable leg is moved forwards, the moving direction of the robot being controlled by the steering wheels of the sliding leg.

Procedure 2: the movable driving leg lands on the ground quickly and bears load, and is then switched into the standing phase; while the former driving leg in the standing phase is switched into a driving leg, with at least one of the three wheels of the driving leg being completely braked (locked); one or more wheels of the driving leg that are unidirectionally braked or completely braked reach the ground quickly and kick the ground quickly to drive the sliding leg to move; and then the driving leg is raised and moved forwards, the moving direction of the robot being controlled by the steering wheels of the sliding leg.

For steering, besides being completed by the steering wheels, the direction of movement can also be changed during the alternating of the two legs.

(3) repeating the movement process to achieve a long distance movement, or stopping the robot by means of at least one of the three actions of:
 a) the leg in the standing phase is braked;
 b) the leg in the movable phase stands on the ground and is braked;
 c) the leg in the standing phase is braked, and at the same time, the leg in the movable phase stands on the ground and is braked.

In practice, as a force-applying leg (driving leg), only unidirectional braking function is possible (cannot be reversed). As a force-applying leg, single-toe driving is relatively simple, and the other two toes are left floating. When the road is slippery, drive with two or three toes is preferred.

Advantages of the new roller skating method are discussed below.

The driving (force applying) direction is the same as the moving direction, and the force is directly applied to the rear, so the driving efficiency is high. There is also no need to change the position of the center of gravity for easy control. When skating, turn with steering wheels for more flexible steering. Compared with the wheel configuration, this wheel skating configuration has the advantage that the wheels do not need to be equipped with electric motors. Reduced structural complexity and reduced total drive power. The wheel-legged walking robot has five movement modes: walking, crawling, wheeling, sliding, and rolling. Has the ability to move in almost any state.

The roller skating configuration and the two-row leg configuration can be applied to a hybrid-connection walking robot with various structural configurations, and can also be used in the structure of Document 1.

The advantages of the hybrid-connection walking robot are decoupling of step size and step height. It is easy to control, has the largest step size, and has a large obstacle surging ability.

In order to adapt to various complicated road surfaces, there are elastic pads at the end of the toes or a universal joint (ball joints are also possible), and elastic pads under the universal joints or ball joints. The metatarsal branch chain of the embodiment may be designed with negative pairs, such as U, S kinetic pairs. The leg mechanism proposed by the present invention can also be arranged in a bionic manner to form a bionic walking robot with front, back, left and right legs, including two legs, four legs, six legs and eight legs.

The invention claimed is:

1. A hybrid-connection walking robot construction method, wherein the construction method comprises the steps of:
 (1) constructing foot parallel mechanisms and thigh mechanisms, including:
 constructing the foot parallel mechanisms:
 wherein each foot parallel mechanism comprises one foot base platform, three phalange branch chains and three toes, the three phalange branch chains are fixedly connected to the foot base platform at connection points which are located on the three vertices of a triangle; lower ends of the three phalange branch chains are connected to the toes respectively, and the three toes form a toe triangle; the foot parallel mechanism forms a lifting-standing leg; and each phalange branch chain is a mechanism formed by the combination of the following types of DOFs (degrees of freedom): Tz, TzTx, TzTy, TzTxTy, RxTz, RyTz, RxTzTx, RyTzTy or RxRyTz;

constructing the thigh mechanisms:

wherein each thigh mechanism comprises an upper platform, a lower platform and one or more thigh branch chains connecting the upper platform with the lower platform; each thigh branch chain comprises one kinematic pair, one or more series mechanisms, or a hybrid-connection mechanism; the thigh mechanism is a mechanism with one to five DOFs; and the one to five DOFs comprise any one of or any combination of Tx, Ty, Tz, Rz and Rx DOFs or Tx, Ty, Tz, Rz, Rx and Ry DOFs, and include a single DOF, 2 DOFs, 3 DOFs, 4 DOFs or 5 DOFs;

(2) constructing hybrid-connection leg mechanisms:

wherein each hybrid-connection leg mechanism comprises one thigh mechanism and one foot parallel mechanism, the foot parallel mechanism being located below the thigh mechanism, and the two being connected in series to form a hybrid-connection leg mechanism; and the foot base platform of the foot parallel mechanism or the lower platform of the thigh mechanism is selected as a common base platform;

(3) selecting two suitable leg mechanisms A and B:

in the above mentioned hybrid-connection leg mechanisms, one hybrid-connection leg mechanism is selected as leg mechanism A;

in the above mentioned hybrid-connection leg mechanisms and foot parallel mechanisms, one hybrid-connection leg mechanism or foot parallel mechanism is selected as leg mechanism B;

wherein the combination of the DOFs of the two leg mechanisms should meet the following requirement:

the two leg mechanisms must at least have one Rz DOF and one Tx or Ty DOF, or the hybrid-connection leg mechanism of at least one thigh mechanism has both Rz DOF and Tx or Ty DOF; or two thigh mechanisms each have Rz DOF and Tx or Ty DOF;

(4) connecting the two leg mechanisms A and B to build a hybrid-connection walking robot wherein if the two leg mechanisms A and B are two hybrid-connection leg mechanisms, the upper platforms of the thigh mechanisms of the two leg mechanisms A and B are fixedly connected together so that the two connected upper platforms form a pelvis and the two connected leg mechanisms form a hybrid-connection walking robot;

if one of the two leg mechanisms is a hybrid-connection leg mechanism and the other one is a foot parallel mechanism, the upper platform of the thigh mechanism of the hybrid-connection leg mechanism is fixedly connected with the foot base platform of the foot parallel mechanism so that the two connected platforms form a pelvis and the two connected leg mechanisms form a hybrid-connection walking robot; and for the above connecting, the thigh branch chains, the base platforms, metatarsal branch chains, the toes and toe triangles should meet the following layout requirements:

each thigh branch chain of the two leg mechanisms has its own independent movement space, without any interference with each other;

the two base platforms must be disposed in a manner of: one be higher and the other be lower, or one be inside and the other be outside, or one be forward and the other be backward, without any interference with each other;

the metatarsal branch chains of the two leg mechanisms each have their own independent working space, without any interference with each other;

the projections of the toes of the two leg mechanisms on the horizontal plane do not overlap each other;

the distance between the centers of gravity of the toe triangles of the connected two leg mechanisms is less than the sum of the radii of the circumcircles of the two toe triangles, and the projections of the two toe triangles on the horizontal plane have an overlapping portion.

2. A hybrid-connection walking robot constructed using the hybrid-connection walking robot construction method according to claim 1, comprising two leg mechanisms —leg mechanisms A and B, one leg mechanism A being a hybrid-connection leg mechanism, and the other leg mechanism B being a hybrid-connection leg mechanism or a foot parallel mechanism; wherein upper portions of the two leg mechanisms are connected together, and the hybrid-connection leg mechanism comprises a foot parallel mechanism and a thigh mechanism;

the foot parallel mechanism:

it comprises one foot base platform, three phalange branch chains and three toes, the three phalange branch chains are fixedly connected to the foot base platform at connection points which are located on the three vertices of a triangle; lower ends of the three phalange branch chains are connected to the toes respectively, and the three toes form a toe triangle; the foot parallel mechanism forms a lifting-standing leg; and the phalange branch chain is a branch chain having one or more DOFs; the DOFs of the phalange branch chains are a combination of one or more selected DOFs from a group of Tz, TzTx, TzTy, TzTxTy, RxTz, RyTz, RxTzTx, RyTzTy and RxRyTz; and the three phalange branch chains are of the same type or different types;

the thigh mechanism:

it comprises an upper platform, a lower platform and one or more thigh branch chains connecting the upper platform with the lower platform; the lower platform of the thigh mechanism is a foot arch type base platform; each thigh branch chain comprises one kinematic pair, one or more series mechanisms, or a hybrid-connection mechanism; the thigh mechanism is a mechanism with one to five DOFs; and the one to five DOFs comprise any one of or any combination of Tx, Ty, Tz, Rz and Rx DOFs or Tx, Ty, Tz, Rz, Rx and Ry DOFs;

the hybrid-connection leg mechanism:

it comprises one thigh mechanism and one foot parallel mechanism, the foot parallel mechanism being located below the thigh mechanism, and the two being connected in series to form a hybrid-connection leg mechanism; the foot parallel mechanism and the thigh mechanism share one platform, and the two are connected together by one base platform;

the two leg mechanisms A and B:

one leg mechanism A is a hybrid-connection leg mechanism, and the other leg mechanism B is a hybrid-connection leg mechanism or a foot parallel mechanism;

wherein the combination of the DOFs of the two leg mechanisms should meet the following requirement:

the thigh mechanisms of the two leg mechanisms must at least have one Rz DOF and one Tx or Ty DOF, or the hybrid-connection leg mechanism of at least one thigh mechanism has both Rz DOF and Tx or Ty DOF; or two thigh mechanisms each have Rz DOF and Tx or Ty DOF;
wherein if the two leg mechanisms A and B are two hybrid-connection leg mechanisms, the upper platforms of the thigh mechanisms of the two leg mechanisms A and B are fixedly connected together so that the two connected upper platforms form a pelvis and the two connected leg mechanisms form a hybrid-connection walking robot; if one of the two leg mechanisms is a hybrid-connection leg mechanism and the other one is a foot parallel mechanism, the upper platform of the thigh mechanism of the hybrid-connection leg mechanism is fixedly connected with the foot base platform of the foot parallel mechanism so that the two connected platforms form a pelvis and the two connected leg mechanisms form a hybrid-connection walking robot;
each thigh branch chain of the two leg mechanisms has its own independent movement space, without any interference with each other;
the two base platforms are disposed in a manner of: one be high and the other be low, or one be inside and the other be outside, or one be front and the other be back, without any interference with each other;
the metatarsal branch chains of the two leg mechanisms each have their own independent working space, without any interference with each other;
the projections of the toes of the two leg mechanisms on the horizontal plane do not overlap each other;
the distance between the centers of gravity of the toe triangles of the connected two leg mechanisms is less than the sum of the radii of the circumcircles of the two toe triangles, and the projections of the two toe triangles on the horizontal plane have an overlapping portion.

3. The hybrid-connection walking robot according to claim 2, wherein the phalange branch chain has at least one metatarsal branch chain which has one translational DOF in Z-axis direction as well as one or two translational DOFs in horizontal directions.

4. The hybrid-connection walking robot according to claim 2, wherein the thigh mechanisms are spatial parallel mechanisms or hybrid-connection mechanisms, and their DOF combination comprises one selected from: 3TRz, (3TOR)Rz, (3TRz)Rz, (TxTy)Rz.

5. The hybrid-connection walking robot according to claim 2, wherein the thigh mechanisms are planar parallel mechanisms, and their DOF combination comprises one selected from: TxTyRz, TxTy, TxRz, TyRz.

6. The hybrid-connection walking robot according to claim 2, wherein the distance between the centers of gravity of the toe triangles of the two leg mechanisms A and B meet one of the following two conditions:
   a) the distance between the centers of the toe triangles of the two leg mechanisms is 0 or less than 0.20 (Ra+Rb);
   b) the distance between the centers of the toe triangles of the two leg mechanisms is larger than or equal to 0.30 (Ra+Rb) but smaller than 0.70 (Ra+Rb),
   where Ra is the radius of the circumcircle of the toe triangle of leg mechanism A, and Rb is the radius of the circumcircle of the toe triangle of leg mechanism B.

7. The hybrid-connection walking robot according to claim 2, comprising a leg mechanism A, a leg mechanism B and a pelvis, and a first kinetic pair of the metatarsal branch chain of the leg mechanism comprises one selected from the following three types of kinetic pairs:
   A) the first kinetic pair of the metatarsal branch chain is a double-acting translational pair, the axis of the translational pair being perpendicular to the plane of the base platform;
   B) the first kinetic pair of the metatarsal branch chain is a rotational pair, and the metatarsal branch chain is PHRHP, the axis of the rotational pair being perpendicular to the plane of the base platform;
   C) the first kinetic pair of the metatarsal branch chain is a rotational pair, the axis of the rotational pair being parallel to the plane of the base platform.

8. The hybrid-connection walking robot according to claim 7, wherein a big ring is connected to the pelvis, the big ring is on a plane which is coplanar with the pelvic plane, the center of the big ring is at the same location with the center of the pelvis, and the diameter of the big ring is greater than the diameter of the circumcircle of the toe triangle.

9. The hybrid-connection walking robot according to claim 8, wherein the big ring is an expandable and shrinkable ring.

10. The hybrid-connection walking robot according to claim 2, wherein all the toes of at least one leg mechanism of said leg mechanisms are toes composed of wheeled rotational pairs, the axis of each wheeled rotational pair is parallel to the plane of a basic platform, and at least one of the wheeled rotational pairs is a steering wheel which is provided with a locking or braking device.

11. The hybrid-connection walking robot according to claim 2, wherein the foot parallel mechanism has a transmission box mounted on the base platform; the transmission box has one input end and two or three output ends, each one of the output ends being connected to a metatarsal branch chain; the two or three output ends have translating or rotating directions which face towards each other or face away from each other; and the shape of the transmission box is consistent with the shape of the whole base platform or a part of the base platform.

12. The hybrid-connection walking robot according to claim 2, wherein six toes of the two hybrid-connection leg mechanisms are located on two parallel straight lines, each straight line having three toes.

13. The hybrid-connection walking robot according to claim 2, wherein the two thigh mechanisms each have a hip joint platform, at least one hip joint platform of the thigh mechanisms being located at a lowest level.

14. The hybrid-connection walking robot according to claim 2, wherein a hip joint platform of one thigh mechanism is located at a lowest level, and a hip joint of the other thigh mechanism is located at a highest level; frames of the highest and lowest platforms are connected to each other at their peripheries or centers; the frames of the highest and lowest platforms are disc-shaped, the highest platform being a convex disc, and the lowest platform being a concave disc; the two disc-shaped platforms are stacked together to form a discus-shaped pelvis; the base platforms, branch chains and corresponding equipment of the thigh mechanism are located between the highest and lowest hip joint platforms; holes are formed along the periphery of the discus-shaped pelvis, and the metatarsal branch chains extend through the holes; the two hybrid-connection leg mechanisms are each equipped with double-acting metatarsal branch chains; the double-acting metatarsal branch chains share one drive device or drive component, and are driven mutually by means of a transmission device or by means of a clutch switching device; and a double-sided hybrid-connection walking or crawling robot is constituted in this way.

15. The hybrid-connection walking robot according to claim 14, wherein the periphery of the discus-shaped pelvis, including an outer ring of the discus-shaped pelvis and a connecting portion between two adjacent holes, is made of an elastic material.

16. The hybrid-connection walking robot according to claim 14, wherein edges of the holes in the periphery of the discus-shaped pelvis and the corresponding metatarsal branch chains are connected by a material or structure having an expandable and shrinkable property to form an enclosure structure.

17. The hybrid-connection walking robot according to claim 10, wherein it is moved in the following manner:
- (1) a preparation state: one leg is in a standing phase, the wheels of which are free to rotate so that this leg is a sliding leg, and the other leg is in a movable phase to form a driving leg;
- (2) a movement process:
- 2.1) a first action of stepping on the ground applying a force on the ground: at least one of the three wheels of the movable driving leg is completely braked; one or more wheels of the driving leg that are unidirectionally braked or completely braked reach the ground quickly and kick the ground quickly to drive the standing leg to move; and then the driving leg is raised and moved forwards; the wheels of the sliding leg act as steering wheels by means of which the moving direction of the robot can be changed;
- 2.2) a second action of stepping on the ground applying a force on the ground in any one of the procedures 1 and 2:

procedure 1: at least one of the three wheels of the movable driving leg is completely braked; one or more wheels of the driving leg that are unidirectionally braked or completely braked reach the ground quickly again and kick the ground quickly to drive the sliding leg to move further; and then the movable leg is raised and moved forwards, the moving direction of the robot being controlled by the steering wheels of the sliding leg; and at the same time, the waist of the robot moves forwards;

procedure 2: the movable driving leg lands on the ground quickly and is then switched into the standing phase to becoming a sliding leg; while the former driving leg in the standing phase is switched into a driving leg, with at least one of the three wheels of the driving leg being completely braked; one or more wheels of the driving leg that are unidirectionally braked or completely braked reach the ground quickly and kick the ground quickly to drive the sliding leg to move; and then the driving leg is raised and moved forwards, the moving direction of the robot being controlled by the steering wheels of the sliding leg;

- (3) repeating the movement process to achieve a long distance movement, or stopping the robot by means of at least one of the three actions of:
- a) the leg in the standing phase is braked;
- b) the leg in the movable phase stands on the ground and is braked;
- c) the leg in the standing phase is braked, and at the same time, the leg in the movable phase stands on the ground and is braked.

* * * * *